US012700254B2

(12) United States Patent
Agarwal et al.

(10) Patent No.: US 12,700,254 B2
(45) Date of Patent: Aug. 4, 2026

(54) TECHNIQUES OF INFORMATION EXTRACTION FOR SELECTION MARKS

(71) Applicant: Oracle International Corporation, Redwood Shores, CA (US)

(72) Inventors: Amit Agarwal, Kolkata (IN); Srikant Panda, Bangalore (IN); Kulbhushan Pachauri, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 517 days.

(21) Appl. No.: 18/240,343

(22) Filed: Aug. 30, 2023

(65) Prior Publication Data

US 2025/0078555 A1     Mar. 6, 2025

(51) Int. Cl.
G06V 30/412       (2022.01)
G06V 30/19        (2022.01)
G06V 30/413       (2022.01)

(52) U.S. Cl.
CPC ...... G06V 30/412 (2022.01); G06V 30/19007 (2022.01); G06V 30/19173 (2022.01); G06V 30/19187 (2022.01); G06V 30/413 (2022.01)

(58) Field of Classification Search
CPC .... G06V 30/41; G06V 30/412; G06V 30/413; G06V 30/416; G06V 30/19007; G06V 30/19173; G06V 30/19187
See application file for complete search history.

(56) References Cited

U.S. PATENT DOCUMENTS

| | | | |
|---|---|---|---|
| 7,975,920 B2 | 7/2011 | Chung et al. | |
| 11,126,837 B1 | 9/2021 | Savalia et al. | |
| 11,288,719 B2 | 3/2022 | Xu et al. | |
| 12,056,171 B2 * | 8/2024 | Sahoo | G06F 40/186 |
| 12,182,102 B1 * | 12/2024 | Matton | G06V 30/10 |

(Continued)

FOREIGN PATENT DOCUMENTS

| | | |
|---|---|---|
| CN | 109816051 A | 5/2019 |
| CN | 114708603 A | 7/2022 |
| WO | 2016041004 A1 | 3/2016 |

OTHER PUBLICATIONS

U.S. Appl. No. 18/240,344, Notice of Allowance, Mailed On Oct. 10, 2025, 14 pages.

(Continued)

*Primary Examiner* — Daniel G Mariam

(74) *Attorney, Agent, or Firm* — Kilpatrick Townsend & Stockton LLP

(57) ABSTRACT

A method may include receiving a primary document including one or more selection boxes, one or more text lines, and one or more annotations. The method may include determining, a class based on the annotations. The method may include identifying the one or more selection boxes and one or more text lines of the primary document. The method may include generating a graph representing the one or more selection boxes and the one or more text lines. The method may include mapping each of the one or more selection boxes to a respective text line of the one or more text lines of the graph based at least in part on one or more characteristics associated with the selection boxes. The method may include generating a key-value pair associated with each of the one or more text lines and generating a document model of the primary document.

20 Claims, 14 Drawing Sheets

(56) References Cited

U.S. PATENT DOCUMENTS

| | | | | |
|---|---|---|---|---|
| 12,400,467 | B2 * | 8/2025 | Semenov | G06V 10/82 |
| 12,548,359 | B2 | 2/2026 | Panda et al. | |
| 2011/0258182 | A1 | 10/2011 | Singh et al. | |
| 2020/0273078 | A1 * | 8/2020 | Xu | G06V 30/412 |
| 2024/0312232 | A1 | 9/2024 | Wang et al. | |

OTHER PUBLICATIONS

"Boxdetect 1.0.2", Available Online at: https://pypi.org/project/boxdetect/#files, Jan. 19, 2023, 10 pages.

"Extract Data from Check Boxes or Check Box Groups", Available Online at: https://docs.automationanywhere.com/bundle/enterprise-v2019/page/enterprise-cloud/topics/iq-bot/train/iqb-training-extract-from-checkbox., May 12, 2022, 3 pages.

Microsoft, "Form Recognizer General Document Model", Article 9 contributors, Mar. 13, 2023, 6 pages.

"Selection Elements", Available Online at: https://docs.aws.amazon.com/textract/latest/dg/how-it-works-selectables.html, Accessed from Internet on Apr. 26, 2023, 9 pages.

"What is Amazon Textract?", Available at: https://docs.aws.amazon.com/textract/latest/dg/what-is.html, 2022, 2 pages.

"Yolo Modeling for "checkboxes" Detection/Classification", Available Online at: https://www.evoketechnologies.com/blog/yolo-modeling-for-checkboxes-detection-classification, May 2016, 8 pages.

Hofman , "Deep Learning Methods for Checkboxes Detection and Classification", Available Online at: https://zelros.medium.com/deep-learning-methods-for-checkboxes-detection-and-classification-ebffa221bd0, Dec. 23, 2020, 9 pages.

Kurama , "Checkbox Detection & Extraction", Available Online at: https://nanonets.com/blog/checkbox-detection/, 2022, 25 pages.

Sun et al., "Enhanced Table Extraction from Documents with form Recognizer", Available online at https://techcommunity.microsoft.com/t5/ai-cognitive-services-blog/enhanced-table-extraction-from-documents-with-form-recognizer/ba-p/2058011, Jan. 14, 2021, 8 pages.

* cited by examiner

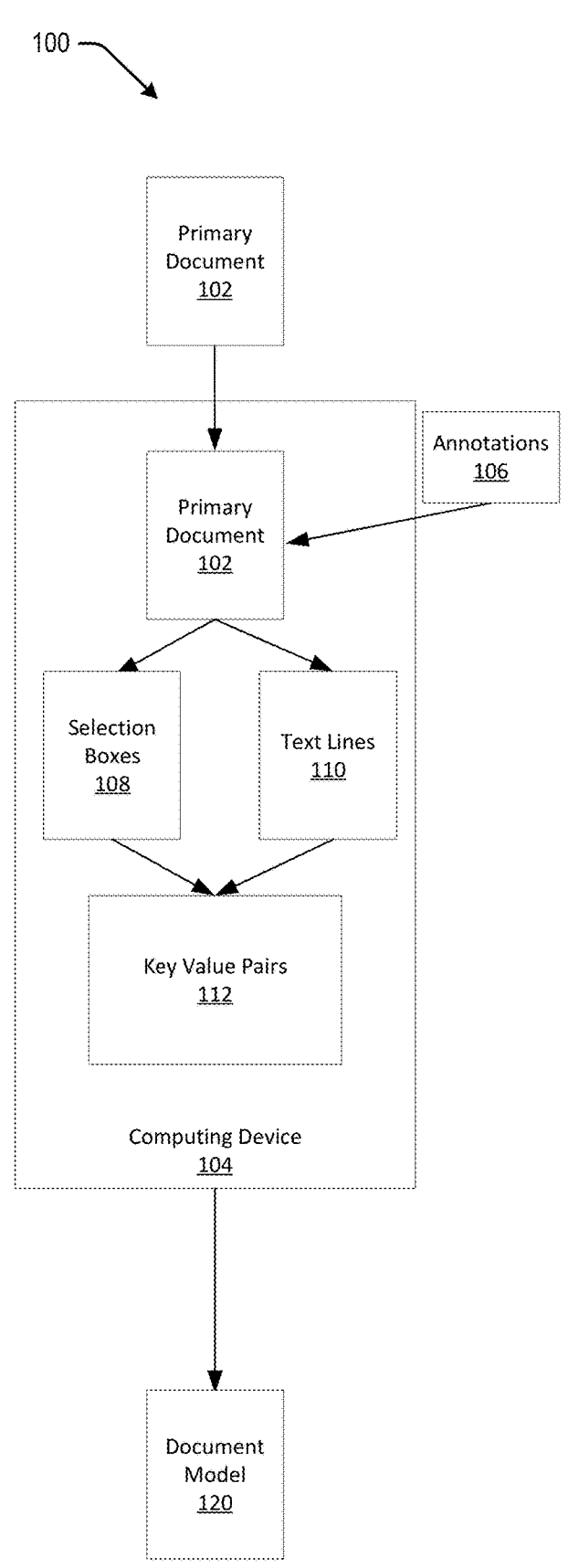
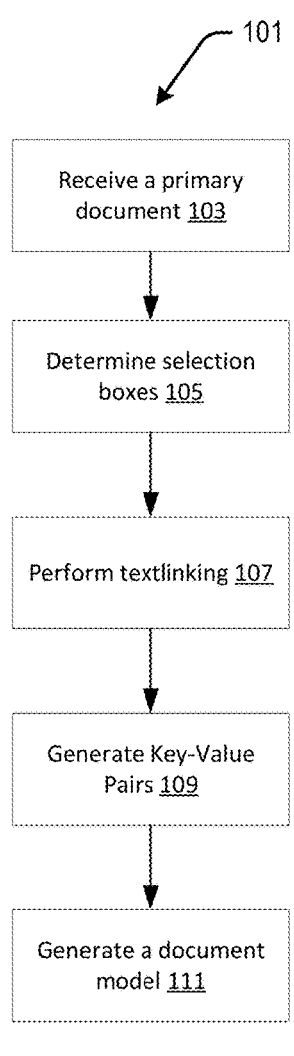
*FIG. 1*

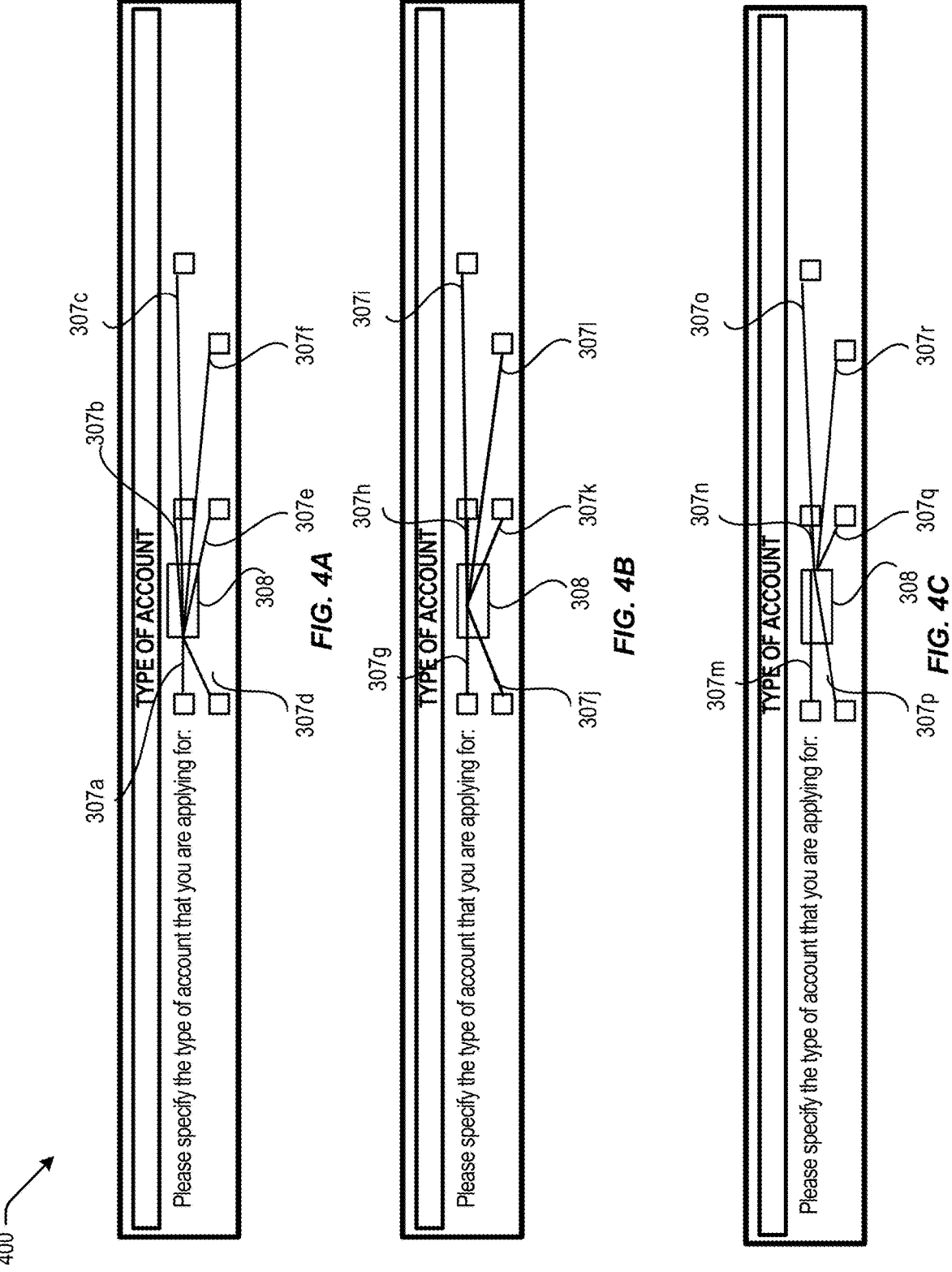

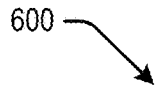
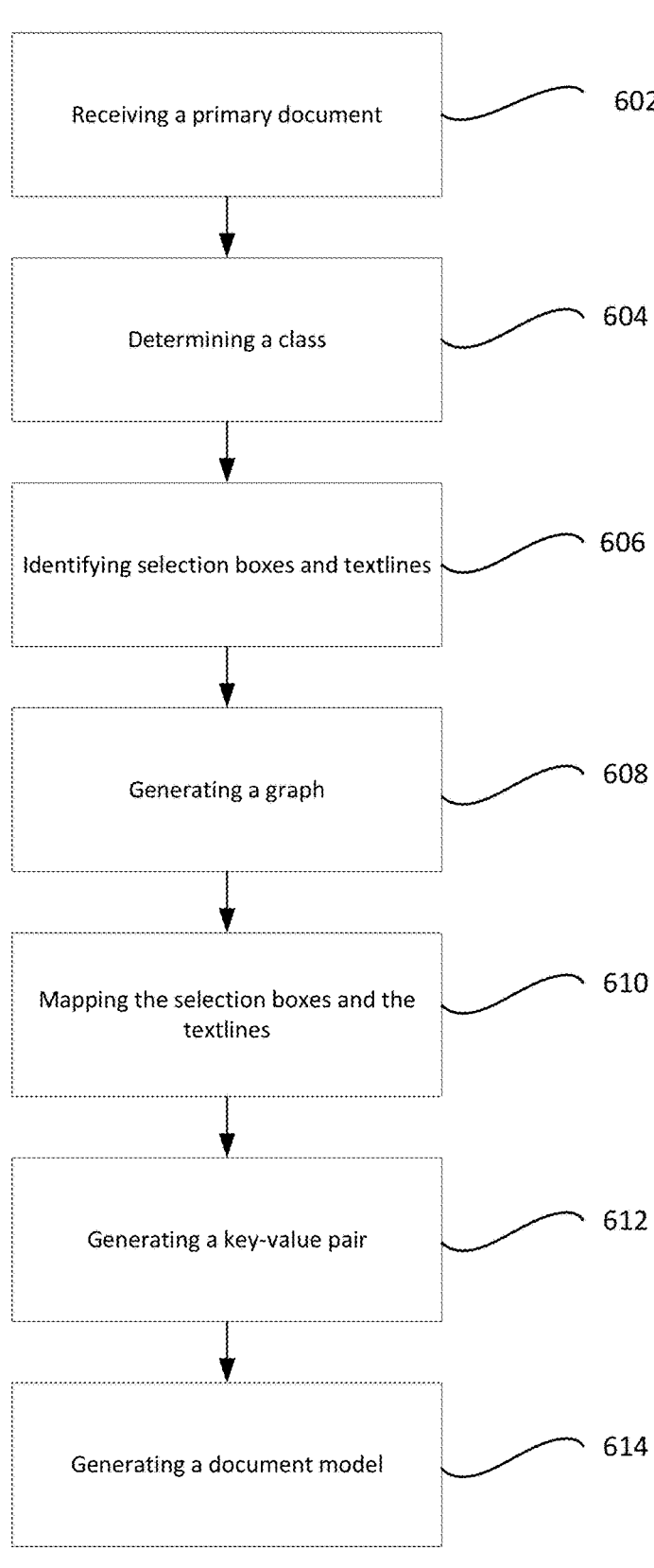
FIG. 6

800

808c

804c

807c4

808b

818

808a

807b4

Divorcee/Widow

807c1

Professional

828b

807c2

806c

807c3

Foreign National

Single

807b1

Post Graduate

828a

806b

807b2

804b

807b3

Married

900

Detect one or more selection boxes and text lines — 902

Detect one or more text lines — 904

Determine respective vectors — 906

Determine a set of respective vectors — 908

Determine a variance — 910

Identify a particular direction — 912

Generate a key value pair — 914

Generate a document model — 916

Extract data according to the document model — 918

TECHNIQUES OF INFORMATION EXTRACTION FOR SELECTION MARKS

BACKGROUND

Data extraction from user-filled documents can pose challenges in associating the correct data with a selection box and/or selection mark. While document recognition systems may be able to determine whether or not the selection box is marked, the document recognition systems may not logically link the text associated with the selection box to the selection box. In other words, linking text with a selection box may require human intervention, leading to inefficiencies. Furthermore, if the extracted data is not classified or associated properly, data extraction, associating, and classifying the extracted data may necessitate additional involvement.

BRIEF SUMMARY

A method may include receiving, by a computing system, a primary document may include one or more selection boxes, one or more text lines, and one or more annotations. The method may include determining, by the computing system, a class based at least in part on the annotations. The method may include identifying, by the computing system, the one or more selection boxes and one or more text lines of the primary document. The method may include generating, by the computing system, a graph representing the one or more selection boxes and the one or more text lines. The method may include mapping, by the computing system, each of the one or more selection boxes to a respective text line of the one or more text lines of the graph based at least in part on one or more characteristics associated with the selection boxes. The method may include generating, by the computing system, a key-value pair associated with each of the one or more text lines based at least in part on the mapping. The method may include generating, by the computing system, a document model of the primary document including the key-value pair.

A computing system may include one or more processors and a non-transitory computer-readable medium containing instructions that, when executed by the one or more processors, cause the system to perform operations. The operations may cause the computing system to receive a primary document may include one or more selection boxes, one or more text lines, and one or more annotations. The computing system may determine a class based at least in part on the annotations. The computing system may determine the one or more selection boxes and one or more text lines associated with the class. The computing system may generate a graph representing the one or more selection boxes and the one or more text lines. The computing system may map each of the one or more selection boxes to a respective text line of the one or more text lines of the graph, based at least in part on one or more characteristics associated with the selection boxes. The computing system may generate a key-value pair for each of the one or more text lines based at least in part on the mapping, where the key is the class and the value is an associated text line. The computing system may generate a document model of the primary document including the key-value pairs.

A non-transitory computer readable medium may include instructions that, when executed by a processor, cause the processor to perform operations. The operations may include receiving, by a computing system, a primary document may include one or more selection boxes, one or more text lines, and one or more annotations. The operations may include determining, by the computing system, a class based at least in part on the annotations. The operations may include determining, by the computing system, the one or more selection boxes and one or more text lines of the primary document. The operations may include generating, by the computing system, a graph representing the one or more selection boxes and the one or more text lines. The operations may include mapping, by the computing system, each of the one or more selection boxes to a respective text line of the one or more text lines of the graph based at least in part on one or more characteristics associated with the selection boxes. The operations may include generating, by the computing system, a key-value pair associated with each of the one or more text lines based at least in part on the mapping. The operations may include generating, by the computing system, a document model of the primary document including the key-value pair.

BRIEF DESCRIPTION OF THE DRAWINGS

FIG. 1 illustrates a system and a process for creating a document model, according to certain embodiments.

FIGS. 4A-4C illustrates a section with respective vectors for a text linking process, according to certain embodiments.

FIG. 6 illustrates a flowchart of a method for generating a document model, according to certain embodiments.

DETAILED DESCRIPTION

Figure 2:
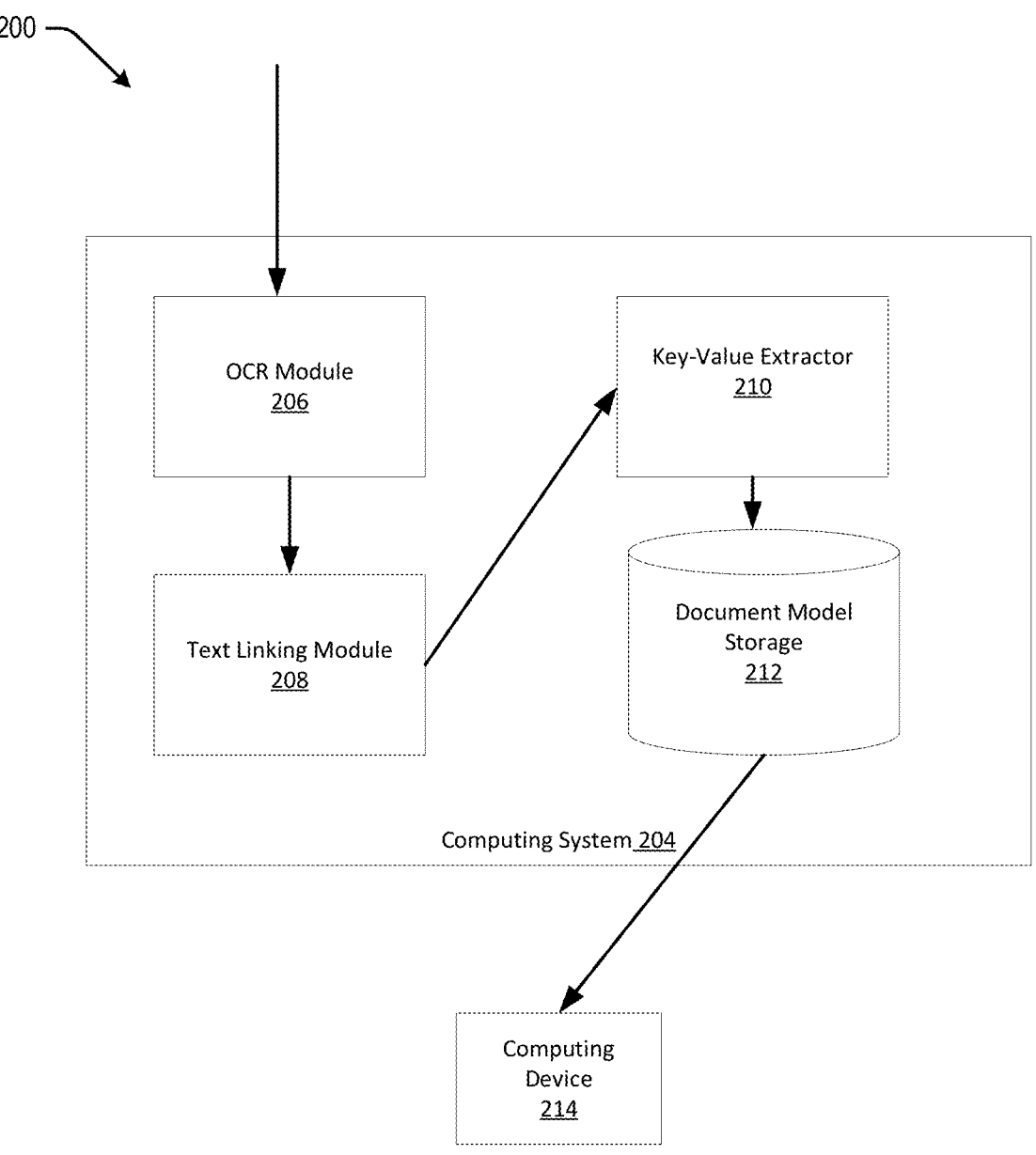
FIG. 2 illustrates a simplified block diagram of a system for generating a document model and extracting data from a user-filled document, according to certain embodiments.

Information extraction from documents may be a key factor improving the effectiveness of Robotic Process Automation (RPA) in document processing applications. By extracting relevant information from large volumes of data, organizations may automate processes such as customer onboarding, invoice processing, and contract analysis. Recent advances in Key Value Extraction (KVE) have made great strides towards automating document processing. A deep learning algorithm may be able to extract user related information from a document image with high accuracy rates, making it ideal for use in RPA applications. Many KVE systems may utilize Optical Character Recognition (OCR) and/or Optical Mark Recognition (OMR) engines to identify or read text and other symbols from the document image (as used herein, "OCR" should be understood to include OMR functionality). These KVE models may classify retrieved text into user defined classes, and extract key-value pairs based on these classes.

For documents containing only text, unmodified KVE models may perform adequately. Real life documents such as customer onboarding forms, invoices, contracts, and other such documents, however, often contain selection boxes and radio buttons with selection marks (e.g., a filled space, check mark, etc.). A selection box may also have corresponding text to the left, right, top, or bottom of the selection mark. An OCR system may detect and extract the selection mark but may not be able link the selection marks with their corresponding text.

In some solutions, a user may annotate each selection box. Then, a KVE system may extract information from each selection box into respective classes. This approach may have drawbacks, however. For example, with this approach, the number of classes may equal the number of selection boxes in a form. The number of classes can significantly affect the accuracy of a KVE model, such as a 0.77% per class decrease in overall accuracy. Another issue is that many forms have a larger class associated with several choices, each represented by a selection box. For example, a "Marital Status" section on a form may include choices for "married," "single," "divorced," etc., each with an associated selection box. The class may actually be "Marital Status," whereas using the approach above, "married" would be one class, "single" would be another class, etc. A user would then have to associate the class with the "Marital Status" in order to extract useable information. Furthermore, the approach above may also fail to extract information filled in by a user (e.g., an "other" selection box with handwritten or typed corresponding text).

One solution to these problems may be to utilize various models in order to appropriately link a selection box and corresponding text. For example, a primary document may be provided to a computing system via an OCR system. The resulting image may be annotated by a user denoting a class with individual selection box or several selection boxes and corresponding text. The computing system may then link each selection box with corresponding text. For example, the computing system may determine a distance and slope between each selection box and all text blocks (e.g., a word) within the annotated class. The computing system may then identify a one-to-one relationship between each selection box and a respective text block. After identifying the one-to-one relationship. A KVE model may extract a key-value pair of data from the primary document.

For example, a primary document may have a section labeled "Preferred Currency." Within the section, there may be several selection boxes with various currencies indicated within the section (e.g., USD, GBR, EUR, MXN, INR, etc.). After being annotated and provided to the computing system as described above, the KVE model may determine that the key of a key-value pair is "Preferred Currency" via a user annotation, machine learning, or other method. Through text linking, the computing system may then determine that the various currencies are potential values for the key-value pair associated with respective selection boxes. A document model based upon the Subsequently, a user-filled form may be provided to the computing system based on the primary document. The computing system may then recognize that a particular selection box of the user-filled documents includes a selection mark within the Preferred Currency section. The computing system may then determine that the various currency associated with the particular selection mark is the value of the key-value pair (e.g., USD). In other words, because the computing system may create a model linking text and selection boxes, data included in user-filled forms may be accurately and efficiently extracted for future processing.

FIG. 1 illustrates a system 100 and a process 101 for creating a document model 120, according to certain embodiments. The system 100 may include one or more computing devices (collectively, a "computing system 104"). The computing system 104 may include one or more hardware and/or software components necessary to perform the steps of the process 101 and/or any other technique described herein. Some or all of the computing system 104 may be unsupervised, meaning that some of the steps of the process 101 may be performed without user interventions. Other steps may accept user input in order to perform the other steps.

At block 103, the computing system 104 may receive a primary document 102. The primary document 102 may be physical document including one or more selection boxes and text. The computing system 104 may receive the primary document 102 using an optical character recognition (OCR) module. The OCR module may be a software and/or hardware component(s), configured to recognize letters, words, and other markings on a document such as the primary document 102. The primary document 102 may be a fillable form without user marks. For example, the primary document 102 may be a bank intake form, used to by an institution to gather customer information in order to open a bank account. In another example, the primary document 102 may be a report form, used to denote one or more facts about a traffic accident. One of ordinary skill in the art would recognize many different possibilities.

In any case, the primary document 102 may include one or more selection boxes, one or more text lines, and/or annotations 106. The annotations 106 may be hand drawn annotations. For example, the annotations 106 may include a bounding box, drawn by a user. The bounding box may encompass a section of the primary document 102 with multiple selection boxes and lines of text. The annotations 106 may additionally or alternatively denote a class associated with the section of the primary document 102 (e.g., an underline under a title of the section). The class may therefore be the title of the section of the primary document 102. Additionally or alternatively, the annotations 106 may include a bounding box about each of the selection boxes in the section and/or on the entire primary document 102. In the case that each selection box is annotated, each selection box may be associated with a unique class. In some embodiments, the annotations 106 may be provided by a user via the computing system 104 after the primary document 102 has been received by the computing system 104. For example, a user may modify a digital representation of the primary document 102 via a user interface to include the annotations 106 (e.g., the bounding boxes described above).

At block 105, the computing system 104 may determine the one or more selection boxes 108 and the one or more text lines 110 included in the primary document 102. A text line may include a letter, word, number, symbol, or other character. The computing system 104 may utilize the OCR module to determine the selection boxes 108 and/or the text lines 110. The computing system 104 may determine just those selection boxes 108 and text lines 110 within an annotated section and/or the selection boxes 108 and text lines 110 in the entire primary document 102.

At block 107, the computing system may "text link" each of the selection boxes 108 to a respective text line 110. In some embodiments, the computing system 104 may "draw" (e.g., logically draw, not necessarily create a physical line) lines from a left edge of the respective text line 110 to a nearest edge of every selection box 108. The computing system 104 may also draw lines from the center of the text line 110 for the nearest edge of every selection box 108. The computing system 104 may then draw lines from a right edge of the text line 110 to the nearest edge of every selection box 108. The computing system 104 may then calculate a distance and slope of each of the drawn lines.

The computing system 104 may then create two logical sets: a first set (sometimes "U") including all of the selection boxes 108 on the primary document 102 and/or the section and; a second set ("sometimes "V") including all of the text lines 110 on the primary document 102 and/or the section. The computing system 104 may then create a graph of the sets U and V, and map each point in U (i.e., the selection boxes 108) to each point in V (i.e., the text lines 110). The graph may include a bipartite graph. Because each text line may have multiple drawn lines connecting each text line 110 to each selection box 108, there may not be a one-to-one relationship between the points in U and the points in V included in the graph. The computing system 104 may then apply a combinatorial optimization algorithm, (e.g., the Hungarian matching algorithm) or other such matching algorithm to the graph, including the drawn lines. The result may include a one-to-one mapping between the points to in U to the points in V. In other words, the computing system 104 may text link a particular text line 110 to a particular selection box 108 within the section of the primary document 102 and/or anywhere in the primary document 102 (in the case no section is annotated). Each selection box 108 is then associated with a single text line 110.

In other embodiments, the computing system 104 may minimize a variance and/or a distance between each selection box 108 and the nearest text line 110 in at least four directions. Because forms may be heavily formatted, the text lines 110 associated with selection boxes 108 may be consistently spaced in some direction from each respective selection box 108. The computing system 104 may determine a vector including a distance between a selection box 108 and the nearest text line 110 and a direction from the selection box 108. For example, a selection box may be associated with a first vector 0.5 cm down (i.e., the nearest text line to the selection box is 0.5 cm below the selection box). A second vector may be 0.8 cm to the left of the selection box, indicating a word 0.8 cm to the left of the selection box. When comparing the first and second vectors to those vectors associated with other selection boxes, the 0.8 cm left vector may be the most consistent vector, meaning that some or all of the selection boxes 108 in the primary documents have a text line 110 0.8 cm to the left. Therefore, the computing system 104 may determine that the text 0.8 cm to the left of each selection box is associated with that selection box. Thus, text linking may be performed by minimizing a distance and direction between each selection box and various text lines. It should be understood that the distances used are only discussed by way of example; the minimized distance and direction may be any direction and any distance.

At block 109, the computing system may generate key-value pairs 112 based at least in part on the classes, selection boxes, and linked text. In the case that a section of the primary document 102 was annotated in the annotations 106, a title of the section may be determined as the class. The class may then be determined to be the key of a key-value pair 112. Each selection box 108 and associated text 110 may therefore be determined to be a potential value of the key-value pair 112. If the title of the section is "martial status," the potential values may include "married," single," "divorced," etc. Thus, a key-value pair 112 may include several options (e.g., maritalstatus_married, maritalstatus_single, etc.). A subsequent user-filled document may then indicate a particular selection box, and one of the options may be determined for the user-filled document (e.g., maritalstatus_married).

In the case that each selection box 108 is annotated, the link associated with each selection box 108 may be considered its own, unique class. Continuing the example from above, a key-value pair 112 may include married_!VALUE, single_!VALUE, etc. If the selection box 108 associated with "married" is marked in a subsequent user-filled document based on the primary document 102, the key-value pair 112 may be married_TRUE. In post-processing, the married_TRUE key-value pair 112 may be later associated with the "marital status" title, either via user input and/or by the computing system 104.

At block 111, the computing system 104 may generate a document model 120. The document model 120 may include the key-value pairs 112 generated by the computing system 104. The document model 120 may be stored in a memory, either on the computing system 104, in a cloud-based storage, on a separate computing device, or any other appropriate method. The document model 120 may also be provided to other computing systems and used to extract data from subsequent user-filled documents based on the primary document 102.

FIG. 2 illustrates a simplified block diagram of a system 200 for generating a document model and extracting data from a user-filled document, according to certain embodiments. The system 200 may include a computing system 204 and a computing device 214. The computing system 204 may be similar to the computing system 104 in FIG. 1, and therefore be configured to perform some or all of the steps included in the process 101. The computing system 204 may include an OCR module 206, a text linking module 208, a key-value pair generator 210, and a document model storage 212. Some or all of the components may be included in a single device (e.g., a personal computer, scanner/copier, etc.), or may be distributed across several devices (e.g., in a cloud environment). Furthermore, the computing system 204 may include more components than are illustrated to facilitate the generation of a document model.

The computing device 214 may include a data extractor 216. The computing device 214 may be a separate device from the computing system 204 or may be part of a single computing system. Additionally, the computing device 214 may include more components than are shown to facilitate document processing (e.g., an OCR module).

The OCR module 206 may receive an image of a primary document such as the primary document 102 in FIG. 1. The OCR module 206 may identify one or more selection boxes and one or more text lines included on the primary document. The OCR module 206 may be a commercially available off-the-shelf OCR module. The OCR module 206 may also be configured to identify a selection mark within a selection box as well, such as a check mark made by a user (e.g., via OMR). The OCR module 206 may also be able to recognize characters that are typed or handwritten into a form. For example, the OCR module 206 may be able to determine a user-written entry on a line next to an "other" selection box.

After the text lines and the selection boxes are identified by the OCR module 206, the text linking module 208 may associate each selection box with a specific text line. The text linking module 208 may then perform one or more text linking operations for the selection boxes and text lines within the section, utilizing techniques such as the graph optimization and/or the vector minimization techniques described above. For example, a veterinary intake form may include a section for "animal type." The section may include a plurality of selection boxes and text lines, such as "dog," "cat," "bird," "other _____," etc. The text linking module 208 may then only link the selection boxes and the text lines within the section. In another example, a health information form may have several sections, each section including a set of selection boxes and text lines. The text linking module 208 may then link selection boxes and text lines within each section of the health information form. In yet another example, an inventory form may include a plurality of selection boxes and text, with no discernible section. The text linking module 208 may then perform the one or more text linking operations for all of the selection boxes on the primary document.

The key-value pair generator 210 may then generate key-value pairs based at least in part on the linked selection boxes and text lines. To do so the key-value pair generator 210 may include and/or utilize a neural net model, a rules-based model, or any other suitable model. The key-value pair generator 210 may also utilize one or more annotations on the primary document in order to generate the key-value pairs. For example, an annotation may flag "animal type" for later processing (e.g., an underline, a highlight, a bounding box, etc.). The key-value pair generator 210 may then determine that "animal type" is a key associated with the primary document, and that "dog," "cat," "bird," "other _____," are potential values associated with the key. In the example of the inventory list, the key-value pair generator 210 determine that each text line associated with a respective selection box is a unique class. For example, the inventory list may have "watermelon," "apple," etc. with linked selection boxes. The key-value pair generator 210 may then determine that "watermelon" and "apple" are keys, the value to be determined by whether the selection box is checked. In other words, the text line may be the key, and the state of the selection box (checked or unchecked) may be the value of the key-value pair.

Using the key-value pairs generated by the key-value pair generator 210, the computing system may generate a document model similar to the document model 120 in FIG. 1. The document model may be stored in the document model storage 212. The document model 120 may include one or more images of the primary document and/or data that causes a computing device (e.g., the computing device 214) to extract certain data from a user-filled document based on the primary document. The document model storage 212 may include a plurality of document models. For example, a bank may have customers in many different countries. The document model storage 212 may therefore include document models of primary documents from each of the different countries (e.g., an account application from each company). The document model storage 212 may then be accessible by many different devices (e.g., the computing device 214) of the bank, to enable the faster processing of account applications. Similarly, the document model storage 212 may be a central repository, where computing systems similar to the computing system 204 generate various document models. The computing device may then access which ever document model needed to extract data from a given user-filled document.

For example, the computing device 214 may be provided with a user-filled document based on the veterinary intake form. A user may have checked the selection box associated with "dog." The computing device 214 may then access a document model from the document model storage 212 corresponding to the veterinary intake form. Using the document model, the computing device 214 may then extract the key-value pair "animaltype_DOG," as the class (and therefore key) is animal type, and the user checked the appropriate selection box. In another example, the user may have checked the "other" box and written in "ferret." The computing device 214 may then extract the key-value pair "animaltype_FERRET."

In yet another example, the computing device 214 may be provided with a user-filled document based on the inventory form. A user may have checked the selection box associated with "apple," but not the selection box associated with "watermelon." Then computing device 214 may then access a document model based on the inventory form from the document model storage 212, and extract key-value pairs "apple_TRUE" and "watermelon_FALSE." In other words, the system 200 may be used not only to generate document models but extract useful data from user-filled documents.

The system 200 may be configured to perform any and/or all of the techniques and methods described herein. For example, the system 200 may be configured to extract data from documents using a method such as the method 600 and/or the method 900, described below. The system 200 may perform the methods 600 and 900 concurrently, separately, or only perform one or the other of the methods 600 and 900.

Figure 3:
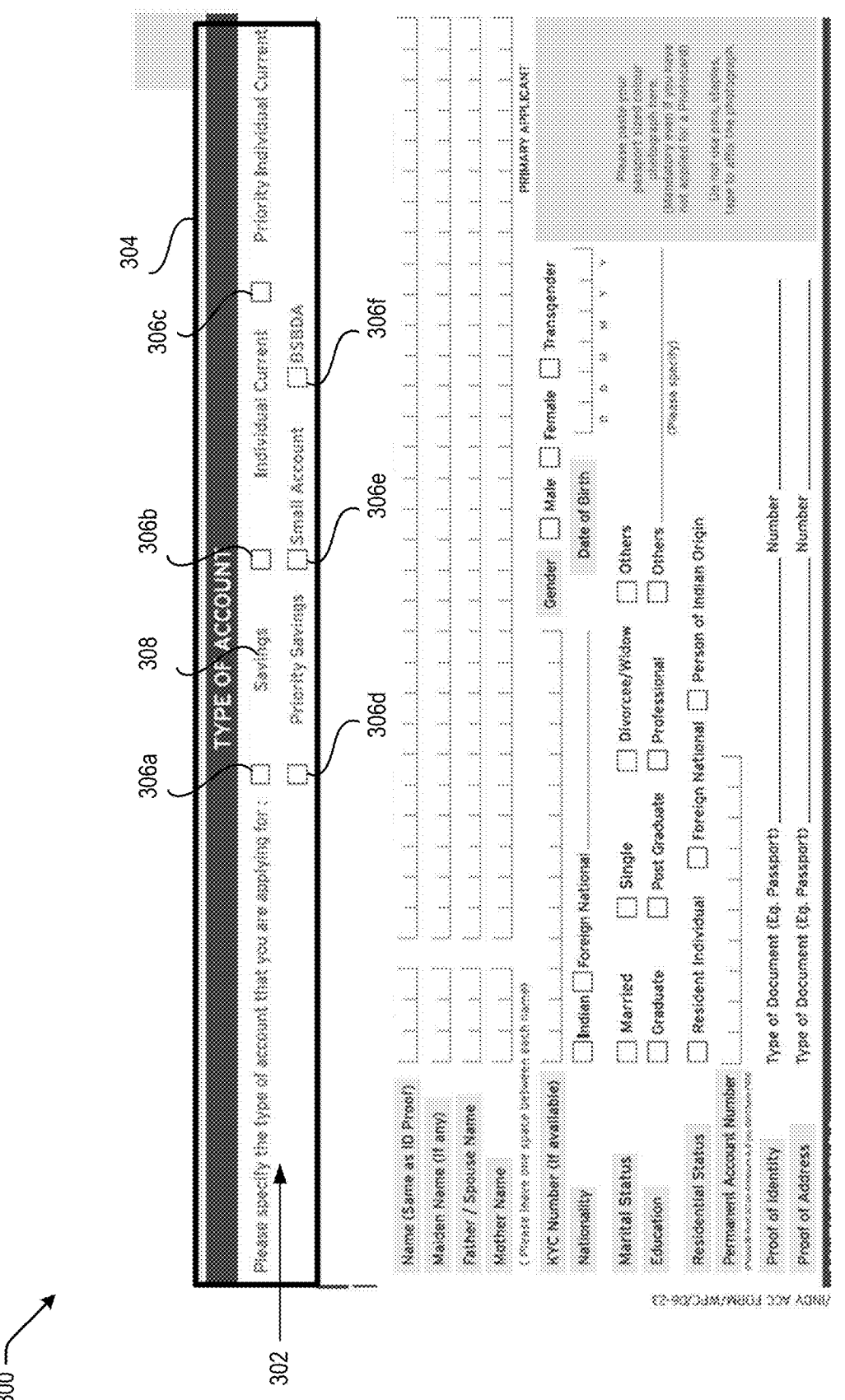
FIG. 3 illustrates a primary document, according to certain embodiments.

FIG. 3 illustrates a primary document 300, according to certain embodiments. The primary document 300 illustrated in FIG. 3 may be a bank account intake form but is merely shown as an example. The techniques and principles described herein may be applied to any type of form or document. The primary document 300 may include a section 302. The section 302 may be annotated by a bounding box 304. The bounding box 304 may be an annotation (e.g., the annotations 106) made by a user, either before or after the primary document 300 is provided to a computing system (e.g., the computing system 204 in FIG. 2.). The section 302 may include selection boxes 306a-f and a text line 308. Although only one section 302 and one bounding box 304 are shown in FIG. 3, it should be understood that the primary document 300 may include any number of sections and/or bounding boxes.

The text line 308 is labelled and described for simplicity in the following example(s); the processes and techniques described below may be performed for each text line included in the section 302. For example, there may be a corresponding number of text lines and selection boxes 306a-f. In the section 302, there may be six selection boxes 306a-f. Therefore, there may also be at least six text lines within the section 302. Additionally, the text line 308 may be represented by a bounding box (as shown below in FIGS. 4A-4C). The bounding be annotated by a user or may be determined by a computing device (e.g., the computing system 204).

FIGS. 4A-4C illustrates a section 400 with respective vectors 410a-f-430a-f for a text linking process, according to certain embodiments. The FIGS. 4A-4C are described together herein. The section 400 may be similar to the section 302 in FIG. 3. The section 400 may therefore include the same selection boxes 306a-f (not labelled) and the text line 308. The text line 308 is shown as a bounding box for simplicity; it should be understood that the text line 308 as illustrated in FIGS. 4A-C contain text, such "Savings" as in the text line 308 in FIG. 3. The section 400 may also include the respective vectors 307a-r. It should be understood that the vectors 307a-r may not be physical or visible lines drawn by a computing device (e.g., the text linking module 208 in FIG. 2) and/or a user. Instead, the respective vectors 307a-r may be logically determined by the computing device to include an angle and a distance (e.g., Euclidean, Manhattan distance, Minkowski or Hamming or any other distance metrics in spatial or vector spaces) from the text line 308 to each of the selection boxes. The respective vectors 307a-r are labelled in FIGS. 4A-C to correspond to the selection boxes 306a-f.

In FIG. 4A, the respective vectors 307a-f may be determined from a left side of the text line 308 to a corresponding selection box. Referring to FIG. 3, the respective vector 307a may be determined from the left side of the text line 308 to the selection box 306a. The respective vector 307b may be determined from the text line 308 to the selection box 306b. The other respective vectors 307c-f may be determined accordingly.

In FIG. 4B, the respective vectors 307g-i may be determined from a center of the text line 308 to the corresponding selection box. Again, referring to FIG. 3, the respective vector 307g may be determined from the rights side of the text line 308 to the selection box 306a. The respective vector 307h may be determined from the text line 308 to the selection box 306b. The other respective vectors 307i-1 may be determined accordingly.

In FIG. 4C, the respective vectors 307m-r may be determined from a right side of the text line 308 to the corresponding text line. Again referring to FIG. 3, the respective vector 307m may be determined from the right side of the text line 308 to the selection box 306a. The respective vector 307n may be determined from the text line 308 to the selection box 306b. The other respective vectors 307o-r may be determined accordingly.

Although only the text line 308 is shown with the respective vectors 307a-r, it should be understood that each text line within the section 400 may have respective vectors determined between the text line and every selection box with the section 400. The result may be a set of respective vectors associated with every text line within the section 400 to every selection box within the section 400. In other words, at least temporarily, every selection box may be text linked to every text line within the section 400.

Once determined, the respective vectors 307a-r may be used to generate a cost matrix. Generally, a cost matrix may be used, in part, to determine absolute and relative relationships between nodes. As applied to the systems and techniques described herein, the nodes of the cost matrix may represent the text line 308 and the selection boxes 306a-f As shown in FIGS. 4A-4C, the respective vectors 307a-r may represent a distance (e.g., Euclidean, Manhattan distance, Minkowski or Hamming or any other distance metrics in spatial or vector spaces) and angle (or slope) between the text line 308 and the selection boxes 306a-f However, the respective vectors 307a-r may also include other information about the relationship between the text line 308 and the respective vectors 307a-r such as a ration between the height and width of the text line 308 and selection boxes 306a-f. The respective vectors 307a-r may be used directly in the cost matrix or may be transformed into position embeddings using a machine learning model. The cost matrix may then be generated using the position embeddings. In some embodiments, the cost matrix may include scalars in addition to or instead of the respective vectors 307a-r. One of ordinary skill in the art would recognize may different possibilities.

Figures 5A, 5B:
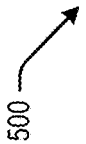
FIGS. 5A-B illustrate a graph, according to certain embodiments.

FIGS. 5A-B illustrate a graph 500, according to certain embodiments. The graph 500 may include a bipartite graph. The graph 500 may be used to optimize a cost matrix defined between nodes (e.g., the text line 308 and the selection boxes 306a-f). The graph 500 may include a set "U" and a set "V." The set U may include representations ('or "points") U1-U4 of all of the selection boxes within a section of a primary document such as the primary document 300 in FIG. 3. The set U may therefore have a number of points corresponding to the selection boxes 306a-f. The set V may include points V1-V4 corresponding to the text lines within the section (e.g., the text line 308 from FIG. 3 and every other text line within the section 302.) The lines connecting various points in the sets U and V may be based at least in part on the respective vectors determined from the text lines to the selection boxes in the section.

In FIG. 5A, each of the points U1-U4 and the points V1-V4 may be connected to any number of points from the alternate set. For example, the point U3 may be connected to the points V1 and V2. The point V3 may be connected to the points U1 and U2. Other connections may also be present, even if not represented. Some points in either of the set U or the set V may be only connected to only one other point (e.g., V4 to U4).

A computing system such as the computing system 204 in FIG. 2 may the optimize the graph 500 such that there is a one-to-one correspondence between each of the points U1-U4 and each of the points V1-V4 (e.g., using the text linking module 208). To optimize the graph 500, the computing system may utilize a combinatorial optimization algorithm, (e.g., the Hungarian matching algorithm) or other such matching algorithm to the graph 500. FIG. 5B shows the graph 500 after being solved by the computing system. The resulting graph 500 may now include a one-to-one correspondence between each point in set U and each point in set V. For example, the point U1 may correspond to the point V3. The point U2 may correspond to the point V2. The point U3 may correspond to the point V1, and so on. In other words, each selection box (the points U1-4) may now be linked to one text line (the points V1-4).

Because there is now a one-to-one correspondence between the selection boxes and the text lines in the primary document, key-value pairs may be generated. Returning to FIG. 3, a title of the section 302 may read "Type of Account." The computing system may identify "Type of Account" as the class, either via an annotation or through some other text linking method. The computing system may therefore identify "Type of Account" as the class associated with the selection boxes 306a-f. The computing system may then determine that "Type of Account" is the key of the key-value pair (e.g., via the key-value pair generator 210). Possible keys for the key-value pair may then include the text line 308, and any other text line, text linked using the graph 500 and related techniques. In relation to FIG. 3, the possible keys may therefore include "savings," "priority savings," etc.

With the key-value pair(s) generated, the document model of the primary document 300 may be generated and stored. Subsequently, a user-filled form may be provided to a computing device based on the primary document 300. The user-filled form may include a selection mark in one of the selection boxes corresponding to the selection boxes 306*a-f*. For example, the user-filled form may include a selection mark (e.g., a check mark) in the selection box corresponding to the selection box 306*a*. Via the graph 500 and related techniques, the document model may indicate that the selection box corresponds to the text line 308, or "savings." Thus, the key-value pair extracted from the user-filled form may be "Type of Account_Savings." The data from the key-value pair may then be stored separately for later processing (e.g., in a database etc.).

FIG. 6 illustrates a flowchart of a method 600 for generating a document model, according to certain embodiments. The method 600 may be performed using some or all of the techniques and systems described herein, such as the system 100 and the system 200 described in FIGS. 1-2. Some or all of the steps of the method 600 may be performed in a different order than what is described, combined, or skipped altogether.

At step 602, the method 600 may include receiving, by a computing system, a primary document (e.g., the primary document 300 in FIG. 3.). The primary document may include one or more selection boxes (e.g., the selection boxes 306*a-f*) and one or more text lines (e.g., the text line 308). The primary document may also include one or more annotations (e.g., the bounding box 304). The one or more annotations may be made by a user, prior to the computing system receiving the document. In some embodiments, the annotations may be made after the primary document is received by the computing system. For example, a user may manipulate a digital representation of the primary document via a user interface or other appropriate method.

At step 604, the method 600 may include determining, by the computing system, a class. The class may be associated with the one or more selection boxes and based at least in part on the annotations. For example, a title of a section of the primary document may be annotated (e.g., an underline, highlight, etc.). The computing system may then determine the title to be the class associated with the one or more selection boxes. In other embodiments, the computing system may determine the class without any annotations. For example, the computing system may compare formatting and positioning of text within the primary document (or a section thereof), to identify likely candidates for class names. Other methods may also be possible.

At step 606, the method 600 may include identifying, by the computing system, the one or more selection boxes and the one or more text lines of the primary document. The computing system may utilize an OCR module such as the OCR module 206 in FIG. 2. The one or more text lines may include a word, a group of words, symbols, numbers, or any other appropriate text.

In some embodiments, the annotations may be associated with a section of the primary document. The section may include a subset of the one or more selection boxes and a subset of the one or more text lines. Some or all of the method may only be performed with the section. In other embodiments, more than one section may be annotated. The method 600 may then be performed within each section, such that any results of the method 6000 are applicable only within each respective section.

At step 608, the method 600 may include generating, by the computing system, a graph representing the one or more selection boxes and the one or more text lines (e.g., the graph 500). The graph may be a bipartite graph. The bipartite may have two sets: a set including points representing the selection boxes and a set including points including points representing the one or more text lines. The points in the sets may be connected via data associated with vectors of an angle and a distance (e.g., Euclidean, Manhattan distance, Minkowski or Hamming or any other distance metrics in spatial or vector spaces) between each text line and each selection box (e.g., the respective vectors 407*a-r* in FIG. 4). Thus, each of the points in both sets may be connected to one or more of the points in the other set. In other words, there may not be a one-to-one correspondence between each point in one set and a point from the other set.

At step 610, the method 600 may include mapping, each of the one or more selection boxes to a respective text line, based on one or more characteristics associated with the selection boxes. The mapping may be performed by solving or optimizing the bipartite graph using a combinatorial optimization algorithm, (e.g., the Hungarian matching algorithm) or other such matching algorithm to the graph. The result may be a one-to-one correspondence between the points in one set to a respective point in the other set (as shown in FIG. 5B).

At step 612, the method 600 may include generating a key-value pair associated with each of one or more text lines. Generating the key-value pair may be associated with the mapping performed above. In one example, the class may be the title of a section of the primary document (as is described above). The key of the key-value pair may then be the class. The one or more text lines may then be potential values of the key value pair. From the example of the Marital Status section of the primary document described in FIG. 1, a key-value pair may include several options (e.g., marital-status_married, maritalstatus_single, etc.). A subsequent user-filled document may then indicate a particular selection box, and one of the options may be determined for the user-filled document (e.g., maritalstatus_married).

In another embodiment, the class may be based on annotations of every selection box. The class (and key of the key-value pair) may therefore be the text line associated with a particular selection box and the value associated with a state of the particular selection box. Continuing the example from above, key-value pairs may include married_!VALUE, single_!VALUE, etc. If the particular selection box associated with "married" is marked in a subsequent user-filled document based on the primary document, the key-value pair for the user-filled document may be married_TRUE. In post-processing, the married_TRUE key-value pair may be later associated with the "marital status" title, either via user input and/or by the computing system.

At step 614, the method 600 may include generating a document model based on the primary document and including the key-value pair. The document model may be stored in a document model storage such as the document model storage 212 in FIG. 2. The document model may be subsequently used by a computing device (e.g., the computing device 214 in FIG. 2) to process a user-filled document or form based on the primary document. The document model storage may be a cloud-based storage, accessible by any number of computing devices for processing documents. Additionally, the document model storage may include any number of document models based on any number of primary documents. Thus, computing devices may access document models for any user-filled document needed.

In some embodiments, the method 600 may include accessing, by the computing system, the document model of the primary document. The computing system may be similar to the computing system 204 in FIG. 2, and/or the computing device 214. The method 600 may then include receiving, by the computing system, a user-filled document based on the primary document. The computing system may then determine that a selection box of the one or more selection boxes has been marked (e.g., a selection mark such as a check mark). In response to determining that the selection box has been marked, the computing system may then extract information associated with the key-value pair associated with the marked selection box. For example, the key-value pair may include several options (e.g., marital-status_married, maritalstatus_single, etc.). The user-filled document may then indicate a particular selection box, and one of the options may be determined for the user-filled document (e.g., maritalstatus_married).

Figure 7:
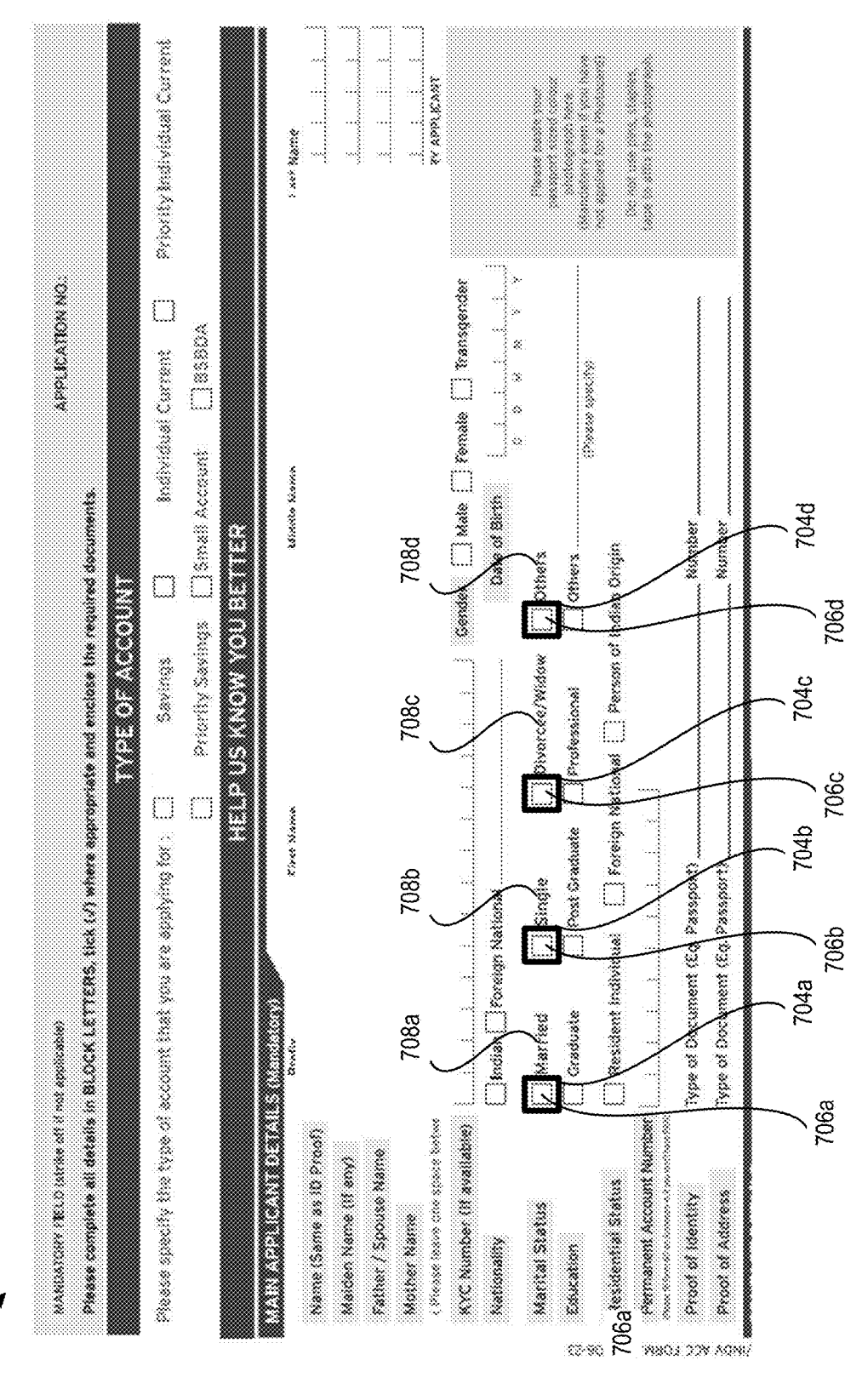
FIG. 7 illustrates a primary document, according to certain embodiments.

FIG. 7 illustrates a primary document 700, according to certain embodiments. The primary document 700 may include annotations 704a-d, selection boxes 706a-d, and text lines 708a-d. Although only the selection boxes 706a-d are annotated, any number of text lines, selection boxes, or other features may be annotated in the primary document 700. In contrast to the primary document 300 in FIG. 3, the annotations 704a-d may be associated with particular selection boxes (e.g., the selection boxes 706a-d) as opposed to a section of the primary document 700 (e.g., the section 302 in FIG. 3). Therefore, a computing system (e.g., the computing system 100 in FIG. 1 or the system 200 in FIG. 2) may determine a unique class for each selection box 706a-d. In some embodiments, a user may further annotate the primary document 700 to indicate the class. For example, an annotation may indicate that the text line 708a ("Married") is a class via an underline, highlight, or other appropriate annotation. Then, the computing system may determine that the text line 708a is associated with the selection box 706a. In other embodiments, the computing system may need to perform text linking operations to determine a class (and key-value pairs).

To perform the text linking operations, the computing system may determine implicit document lines via a clustering technique. For example, the computing system may determine that the text lines 708a-d and the selection boxes 706a-d are in a particular document line based on a positioning relative to the primary document 700 (e.g., a distance to the top and bottom of the primary document 700).

Figure 8:
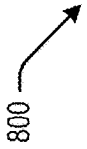
FIG. 8 illustrates selection boxes with corresponding vectors, according to certain embodiments.

FIG. 8 illustrates selection boxes 806b-c with respective vectors 807b1-807c4, according to certain embodiments. The selection boxes 806b-c may be the selection boxes 706b-c on the primary document 700 from FIG. 7. It should be understood that FIG. 8 only shows a portion of the primary document 700 for simplicity. The techniques described herein may be applied to all or some of the selection boxes 706a-d and/or other selection boxes on the primary document from FIG. 8.

In order to perform text linking, a computing system may determine vectors from each selection box 806b-c to each text line 808a-c, 818, and 828a-b. Each selection box 806b-c may therefore have a set of respective vectors, determined in a plurality of directions. The set of corresponding vectors may be determined from each selection box 806b-c and/or bounding boxes 804b-c. For example, the selection box 806b may have respective vectors 807b1-807b4. Each of the respective vectors may include a direction and distance from the selection box 806b to an adjacent text line in the direction. For example, the respective vector 807b1 may be determined between the selection box 806b to the adjacent text line to the right, the text line 808b. The respective vector 807b2 may be determined between the selection box 806b to the nearest text line to the bottom, the text line 828a. The respective vector 807b3 may be determined between the selection box 806b to the nearest text line to the left, the text line 808a. The respective vector 807b4 may be determined between the selection box 806b to the nearest text line to the top, the text line 818. Similarly, the respective vectors 807c1-807c4 may be determined to the left, right, top and bottom of the selection box 806c. If there is no text line adjacent to the selection box (e.g., the selection box is at or near the edge of a primary document), the respective vector in that direction may be set to a maximum value, indicating that there is no text to be linked in that direction.

After determining the respective vectors for each of the selection boxes in the primary document, the computing system may minimize the variance and distance between the respective vectors by comparing the corresponding vectors for one or more selection boxes. The computing system may create sets of respective vectors based on a common direction. For example, the computing system may determine that the respective vectors 807b1 and 807c1 are in a common direction (e.g., right) and create a first set of respective vectors including the respective vectors 807b1 and 807c1. Similarly, the computing system may determine sets of respective vectors for the other directions (e.g., 807b4 and 807c4, 807b3 and 807c3, etc.). While the respective distances of respective vectors in a given set of respective vectors may not be identical, the variance between the respective distances in a particular set of respective vectors may be minimal when compared to respective distances of the other sets of respective vectors For example, in the table below, the respective distances of the respective vectors may be shown, where each column represents a set of respective vectors in a given direction (in vector:distance format).

TABLE 1

| Minimal Variance between sets of respective vectors | | | | |
|---|---|---|---|---|
| | Left | Right | Top | Bottom |
| Selection Box 806b | 807b3: 7 | 807b1: 5 | 807b4: 16 | 807b2: 12 |
| Selection Box 806c | 807c3: 11 | 807c1: 5 | 807c4: 13 | 14 |
| Variance | 4 | 0 | 3 | 2 |

Because the minimal respective distance of respective vectors is found in the respective vectors 807b1 and 807c1 (here, 0), the computing system may then link the text line 808b to the selection box 806b and the text line 808c to the selection box 806c.

After each selection box is linked to a respective text line, the computing system may determine a class and/or the key-value pairs. Returning to FIG. 7, the computing system may text link the selection box 706a with the text line 708a, the selection box 706b with the text line 708b and so on by minimizing the variance between respective vectors (as described above). Thus, each selection box 706a-d may be associated with a unique class. For example, the selection box 706a may be text linked to the text line 708a, "Married." Thus, the selection box 706a may be associated with the class "Married." The class in this case may also be the key of the key-value pair.

After the selection boxes 706a-d are text linked with the text lines 708a-d, the computing system may generate a document model based on the primary document 700. The document model may subsequently be used to extract data from a user-filled document based on the primary document 700. For example, the user-filled document may include a selection mark in the selection box 706a. According to the document model, the key-value pair may therefore be "Married_True." In this case, the other selection boxes 706b-d may not be marked. Therefore, the key-value pairs may be "Single_False," "Divorcee/Widow_False," etc. During post processing, the key-value pairs may be reclassified such that a marital status is reflected by the extracted key-value pairs.

Figure 9:
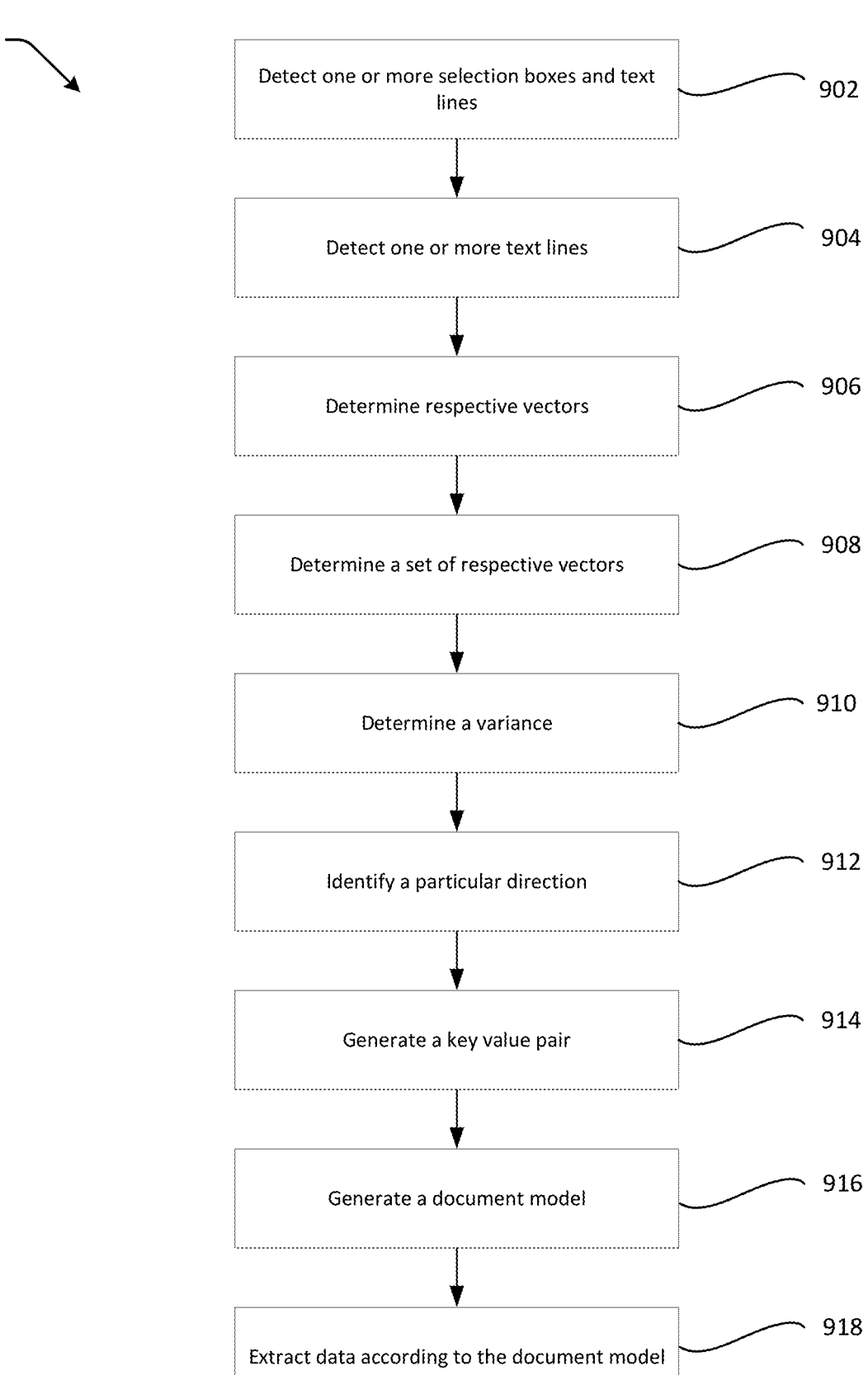
FIG. 9 illustrates a method for generating a document model, according to certain embodiments.

FIG. 9 illustrates a method 900 for generating a document model, according to certain embodiments. The method 900 may be performed by using some or all of the techniques and systems described herein, such as the system 100 and the system 200 described in FIGS. 1-2. Some or all of the steps of the method 900 may be performed in a different order than what is described and/or combined with another step. Some steps may be skipped altogether.

At step 902, the method 900 may include determining, by a computing systemone or more selection boxes in a primary document. The one or more selection boxes may be similar to the selection boxes 706a-d FIGS. 7 and 8. Each of the one or more selection boxes may be annotated, such that each selection box is associated with a unique class. The primary document may be similar to the primary document 700.

At step 904, the method 900 may include determining, by the computing system, one or more text lines in the primary document. The one or more text lines may be similar to the text lines 708a-d in FIG. 7. The computing system may also determine that the one or more text lines and the one or more selection boxes are included in a single document line via clustering techniques.

For each selection box of the one or more selection boxes, at step 906, the method 900 may include determining, by the computing system one or more respective vectors. The one or more respective vectors may be similar to the respective vectors 807b1-807c4 in FIG. 8, and therefore be associated with a particular selection box. The one or more vectors may therefore include a respective distance from the particular selection box to the adjacent text line a in a direction of a plurality directions (e.g., 4).

For each direction in the plurality of directions, at step 908, the method 900 may include determining, by the computing system, a set of respective vectors. Each of the respective vectors may be associated with a unique selection box. For example, as shown in Table 1 above, a set of respective vectors may be with "Left." The respective vector 807b3 may be associated with the selection box 806b, while the respective vector 807c3 may be associated with the selection box 806c. Other sets of respective vectors may be similarly generated.

For each set of respective vectors, at step 910, the method 900 may include determining a variance between the respective vectors included in the set of respective vectors. Returning again to Table 1, the variance between the "Left" respective vectors may be 4, whereas the variance between the "Right" respective vectors may be 0.

At step 912, the method 900 may include identifying a particular direction corresponding to the set of respective vectors characterized by a minimal variance between respective vectors. For example, in Table 1 (and FIG. 8), the set of respective vectors in the "Right" direction may include a variance of 0. As 0 may be the minimal variance as compared to the sets of respective vectors in other directions, the computing system may then link a unique selection box to the adjacent text line to the right of the unique selection box. In some embodiments, the computing system may utilize a neural net model, rules-based model, or any other suitable model to identify the particular direction. In some embodiments, the adjacent text line may include typed or handwritten text.

At step 914, the method 900 may include generating, by the computing device, key-value pairs, based at least in part on the adjacent text line in the direction corresponding to the set of respective vectors characterized by the minimal variance. In relation to FIG. 7, the selection box 706a may be text linked to the text line 708a, "Married." Thus, the selection box 706a may be linked with the class "Married." In some embodiments, the class may also be the key of the key-value pair. The value of the key-value pair may then be determined by a state of the selection box 706a in a subsequent user-filled document (e.g., marked or unmarked).

At step 916 the method 900 may include generating, by the computing device, a document model including key-value pairs. The document model may be stored in a document model storage such as the document model storage 212 in FIG. 2. The document model storage may be a cloud-based storage, accessible by any number of computing systems for processing documents. Additionally, the document model storage may include any number of document models based on any number of primary documents. Thus, computing systems may access document models for any user-filled document needed. The document model may be subsequently used by a computing system (e.g., the computing system 204 in FIG. 2) to process a user-filled document or form based on the primary document.

At step 918, the method 900 may include extracting, by the computing system, data according to the document model. To extract the data, the computing system may access the document model of the primary document. The computing system may then receive a user-filled document based at least in part on the primary document. The computing system may then determine that a selection box of the one or more selection boxes has been marked (e.g., via OCR/OMR). Because the selection box has been linked with an adjacent text line, the state of the selection box (e.g., marked or unmarked), may be used to extract data from the user-filled document. In response to determining that the selection box has been marked, the computing system may then extract data from the user filled document, the extracted data associated with the key value pair of the marked selection box.

In some embodiments, the method 900 may further include determining, by the computing system, one or more classes based at least in part on annotations of the primary document. The annotations may indicate a subset of selection marks and adjacent text lines in the particular direction. The computing system may then assign the class as the key of the key-value pair, and each of the subset of selection marks and adjacent text lines as potential values.

All embodiments described herein may additionally be used to train a relationship extraction model, that may link a selection box with its respective text line automatically. An initial training of the relationship extraction model may require a first primary document with annotations. Subsequent primary documents similar to the first primary document, but not necessarily identical, may then be provided to the relationship extraction model. The relationship extraction model may then utilize determine pseudo-classes included in the first primary document. The pseudo-classes may be identified using either of the methods described in FIGS. 6 and 9, either alone or in combination. The pseudo-classes may be correctly identified as classes (and/or the key of a key-value pair), or the relationship extraction model may be tuned for each subsequent primary document. Thus, as the relationship extraction model develops, a need for annotation of subsequent primary documents may be reduced.

While the disclosure has been described in detail, modifications within the spirit and scope of the disclosure will be readily apparent to those of skill in the art. It should be understood that aspects of the disclosure and portions of various embodiments and various features recited above and/or in the appended claims may be combined or interchanged either in whole or in part. In the foregoing descriptions of the various embodiments, those embodiments which refer to another embodiment may be appropriately combined with other embodiments as will be appreciated by one of ordinary skill in the art. Furthermore, those of ordinary skill in the art will appreciate that the foregoing description is by way of example only and is not intended to limit the disclosure. All US patents and publications cited herein are incorporated by reference in their entirety.

All embodiments described herein may additionally be used to train a relationship extraction model, that may link a selection box with its respective text line automatically. An initial training of the relationship extraction model may require a first primary document with annotations. Subsequent primary documents similar to the first primary document, but not necessarily identical, may then be provided to the relationship extraction model. The relationship extraction model may then utilize determine pseudo-classes included in the first primary document. The pseudo-classes may be identified using either of the methods described in FIGS. 6 and 9, either alone or in combination. The pseudo-classes may be correctly identified as classes (and/or the key of a key-value pair), or the relationship extraction model may be tuned for each subsequent primary document. Thus, as the relationship extraction model develops, a need for annotation of subsequent primary documents may be reduced.

While the disclosure has been described in detail, modifications within the spirit and scope of the disclosure will be readily apparent to those of skill in the art. It should be understood that aspects of the disclosure and portions of various embodiments and various features recited above and/or in the appended claims may be combined or interchanged either in whole or in part. In the foregoing descriptions of the various embodiments, those embodiments which refer to another embodiment may be appropriately combined with other embodiments as will be appreciated by one of ordinary skill in the art. Furthermore, those of ordinary skill in the art will appreciate that the foregoing description is by way of example only and is not intended to limit the disclosure. All US patents and publications cited herein are incorporated by reference in their entirety.

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (example services include billing software, monitoring software, logging software, load balancing software, clustering software, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 10:
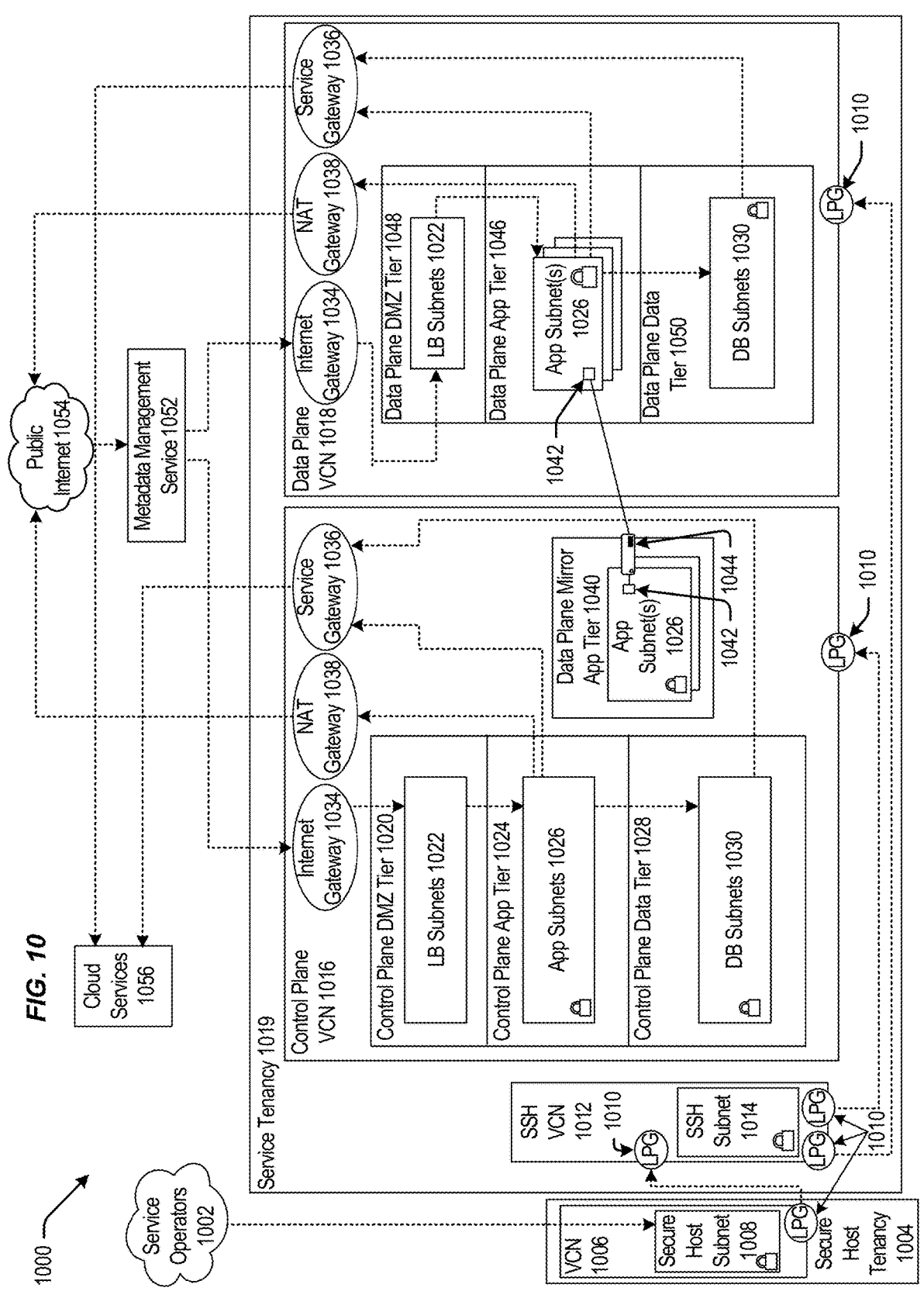
FIG. 10 is a block diagram illustrating one pattern for implementing a cloud infrastructure as a service system, according to at least one embodiment.

FIG. 10 is a block diagram 1000 illustrating an example pattern of an IaaS architecture, according to at least one embodiment. Service operators 1002 can be communicatively coupled to a secure host tenancy 1004 that can include a virtual cloud network (VCN) 1006 and a secure host subnet 1008. In some examples, the service operators 1002 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 1006 and/or the Internet.

The VCN 1006 can include a local peering gateway (LPG) 1010 that can be communicatively coupled to a secure shell (SSH) VCN 1012 via an LPG 1010 contained in the SSH VCN 1012. The SSH VCN 1012 can include an SSH subnet 1014, and the SSH VCN 1012 can be communicatively coupled to a control plane VCN 1016 via the LPG 1010 contained in the control plane VCN 1016. Also, the SSH VCN 1012 can be communicatively coupled to a data plane VCN 1018 via an LPG 1010. The control plane VCN 1016 and the data plane VCN 1018 can be contained in a service tenancy 1019 that can be owned and/or operated by the IaaS provider.

The control plane VCN 1016 can include a control plane demilitarized zone (DMZ) tier 1020 that acts as a perimeter network (e.g., portions of a corporate network between the corporate intranet and external networks). The DMZ-based servers may have restricted responsibilities and help keep breaches contained. Additionally, the DMZ tier 1020 can include one or more load balancer (LB) subnet(s) 1022, a control plane app tier 1024 that can include app subnet(s) 1026, a control plane data tier 1028 that can include database (DB) subnet(s) 1030 (e.g., frontend DB subnet(s) and/or backend DB subnet(s)). The LB subnet(s) 1022 contained in the control plane DMZ tier 1020 can be communicatively coupled to the app subnet(s) 1026 contained in the control plane app tier 1024 and an Internet gateway 1034 that can be contained in the control plane VCN 1016, and the app subnet(s) 1026 can be communicatively coupled to the DB subnet(s) 1030 contained in the control plane data tier 1028 and a service gateway 1036 and a network address translation (NAT) gateway 1038. The control plane VCN 1016 can include the service gateway 1036 and the NAT gateway 1038.

The control plane VCN 1016 can include a data plane mirror app tier 1040 that can include app subnet(s) 1026. The app subnet(s) 1026 contained in the data plane mirror app tier 1040 can include a virtual network interface controller (VNIC) 1042 that can execute a compute instance 1044. The compute instance 1044 can communicatively couple the app subnet(s) 1026 of the data plane mirror app tier 1040 to app subnet(s) 1026 that can be contained in a data plane app tier 1046.

The data plane VCN 1018 can include the data plane app tier 1046, a data plane DMZ tier 1048, and a data plane data tier 1050. The data plane DMZ tier 1048 can include LB subnet(s) 1022 that can be communicatively coupled to the app subnet(s) 1026 of the data plane app tier 1046 and the Internet gateway 1034 of the data plane VCN 1018. The app subnet(s) 1026 can be communicatively coupled to the service gateway 1036 of the data plane VCN 1018 and the NAT gateway 1038 of the data plane VCN 1018. The data plane data tier 1050 can also include the DB subnet(s) 1030 that can be communicatively coupled to the app subnet(s) 1026 of the data plane app tier 1046.

The Internet gateway 1034 of the control plane VCN 1016 and of the data plane VCN 1018 can be communicatively coupled to a metadata management service 1052 that can be communicatively coupled to public Internet 1054. Public Internet 1054 can be communicatively coupled to the NAT gateway 1038 of the control plane VCN 1016 and of the data plane VCN 1018. The service gateway 1036 of the control plane VCN 1016 and of the data plane VCN 1018 can be communicatively couple to cloud services 1056.

In some examples, the service gateway 1036 of the control plane VCN 1016 or of the data plane VCN 1018 can make application programming interface (API) calls to cloud services 1056 without going through public Internet 1054. The API calls to cloud services 1056 from the service gateway 1036 can be one-way: the service gateway 1036 can make API calls to cloud services 1056, and cloud services 1056 can send requested data to the service gateway 1036. But, cloud services 1056 may not initiate API calls to the service gateway 1036.

In some examples, the secure host tenancy 1004 can be directly connected to the service tenancy 1019, which may be otherwise isolated. The secure host subnet 1008 can communicate with the SSH subnet 1014 through an LPG 1010 that may enable two-way communication over an otherwise isolated system. Connecting the secure host subnet 1008 to the SSH subnet 1014 may give the secure host subnet 1008 access to other entities within the service tenancy 1019.

The control plane VCN 1016 may allow users of the service tenancy 1019 to set up or otherwise provision desired resources. Desired resources provisioned in the control plane VCN 1016 may be deployed or otherwise used in the data plane VCN 1018. In some examples, the control plane VCN 1016 can be isolated from the data plane VCN 1018, and the data plane mirror app tier 1040 of the control plane VCN 1016 can communicate with the data plane app tier 1046 of the data plane VCN 1018 via VNICs 1042 that can be contained in the data plane mirror app tier 1040 and the data plane app tier 1046.

In some examples, users of the system, or customers, can make requests, for example create, read, update, or delete (CRUD) operations, through public Internet 1054 that can communicate the requests to the metadata management service 1052. The metadata management service 1052 can communicate the request to the control plane VCN 1016 through the Internet gateway 1034. The request can be received by the LB subnet(s) 1022 contained in the control plane DMZ tier 1020. The LB subnet(s) 1022 may determine that the request is valid, and in response to this determination, the LB subnet(s) 1022 can transmit the request to app subnet(s) 1026 contained in the control plane app tier 1024. If the request is validated and requires a call to public Internet 1054, the call to public Internet 1054 may be transmitted to the NAT gateway 1038 that can make the call to public Internet 1054. Metadata that may be desired to be stored by the request can be stored in the DB subnet(s) 1030.

In some examples, the data plane mirror app tier 1040 can facilitate direct communication between the control plane VCN 1016 and the data plane VCN 1018. For example, changes, updates, or other suitable modifications to configuration may be desired to be applied to the resources contained in the data plane VCN 1018. Via a VNIC 1042, the control plane VCN 1016 can directly communicate with, and can thereby execute the changes, updates, or other suitable modifications to configuration to, resources contained in the data plane VCN 1018.

In some embodiments, the control plane VCN 1016 and the data plane VCN 1018 can be contained in the service tenancy 1019. In this case, the user, or the customer, of the system may not own or operate either the control plane VCN 1016 or the data plane VCN 1018. Instead, the IaaS provider may own or operate the control plane VCN 1016 and the data plane VCN 1018, both of which may be contained in the service tenancy 1019. This embodiment can enable isolation of networks that may prevent users or customers from interacting with other users', or other customers', resources. Also, this embodiment may allow users or customers of the system to store databases privately without needing to rely on public Internet 1054, which may not have a desired level of threat prevention, for storage.

In other embodiments, the LB subnet(s) 1022 contained in the control plane VCN 1016 can be configured to receive a signal from the service gateway 1036. In this embodiment, the control plane VCN 1016 and the data plane VCN 1018 may be configured to be called by a customer of the IaaS provider without calling public Internet 1054. Customers of the IaaS provider may desire this embodiment since database(s) that the customers use may be controlled by the IaaS provider and may be stored on the service tenancy 1019, which may be isolated from public Internet 1054.

Figure 11:
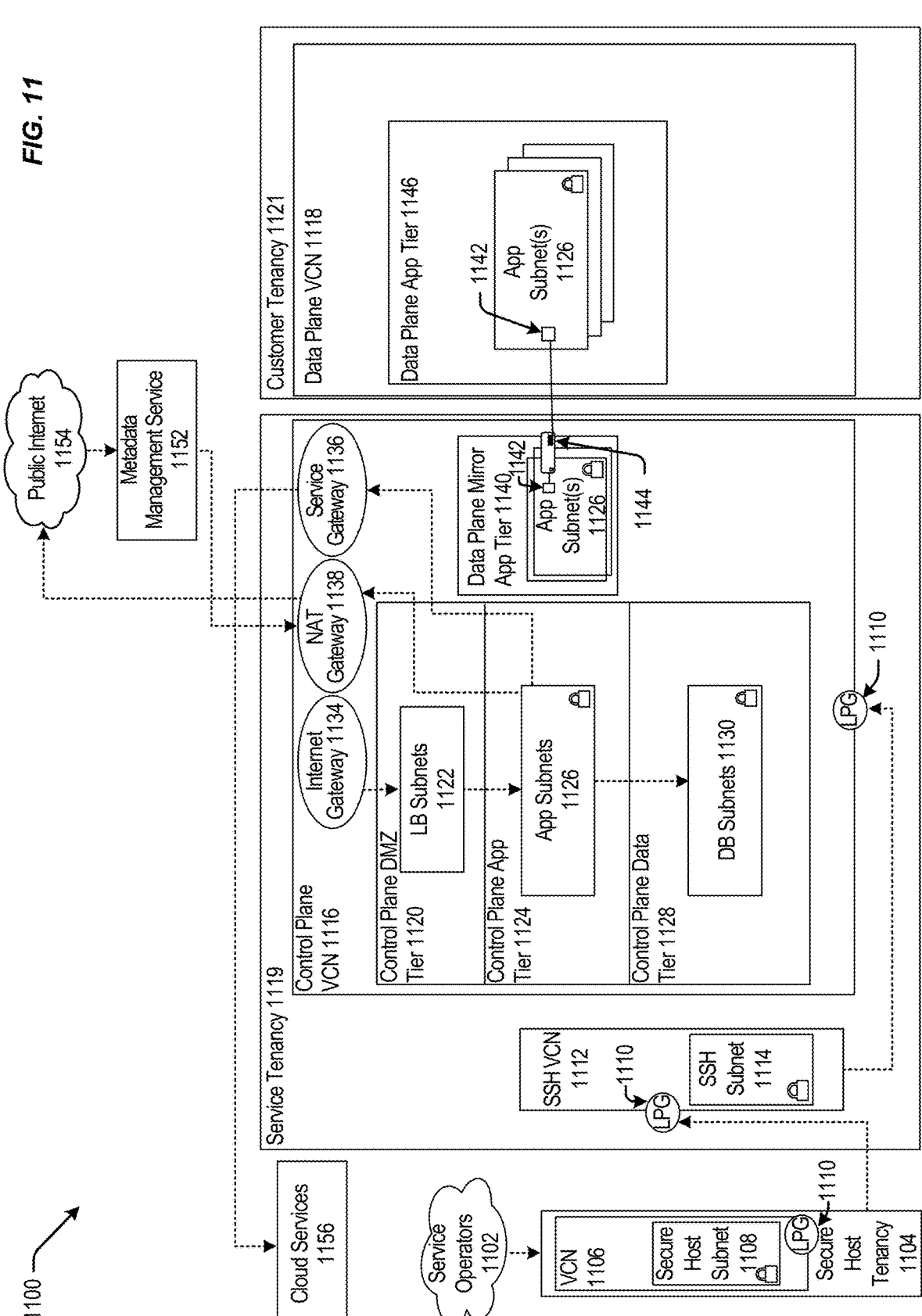
FIG. 11 is a block diagram illustrating another pattern for implementing a cloud infrastructure as a service system, according to at least one embodiment.

FIG. 11 is a block diagram 1100 illustrating another example pattern of an IaaS architecture, according to at least one embodiment. Service operators 1102 (e.g., service operators 1002 of FIG. 10) can be communicatively coupled to a secure host tenancy 1104 (e.g., the secure host tenancy 1004 of FIG. 10) that can include a virtual cloud network (VCN) 1106 (e.g., the VCN 1006 of FIG. 10) and a secure host subnet 1108 (e.g., the secure host subnet 1008 of FIG. 10). The VCN 1106 can include a local peering gateway (LPG) 1110 (e.g., the LPG 1010 of FIG. 10) that can be communicatively coupled to a secure shell (SSH) VCN 1112 (e.g., the SSH VCN 1012 of FIG. 10) via an LPG 1010 contained in the SSH VCN 1112. The SSH VCN 1112 can include an SSH subnet 1114 (e.g., the SSH subnet 1014 of FIG. 10), and the SSH VCN 1112 can be communicatively coupled to a control plane VCN 1116 (e.g., the control plane VCN 1016 of FIG. 10) via an LPG 1110 contained in the control plane VCN 1116. The control plane VCN 1116 can be contained in a service tenancy 1119 (e.g., the service tenancy 1019 of FIG. 10), and the data plane VCN 1118 (e.g., the data plane VCN 1018 of FIG. 10) can be contained in a customer tenancy 1121 that may be owned or operated by users, or customers, of the system.

The control plane VCN 1116 can include a control plane DMZ tier 1120 (e.g., the control plane DMZ tier 1020 of FIG. 10) that can include LB subnet(s) 1122 (e.g., LB subnet(s) 1022 of FIG. 10), a control plane app tier 1124 (e.g., the control plane app tier 1024 of FIG. 10) that can include app subnet(s) 1126 (e.g., app subnet(s) 1026 of FIG. 10), a control plane data tier 1128 (e.g., the control plane data tier 1028 of FIG. 10) that can include database (DB) subnet(s) 1130 (e.g., similar to DB subnet(s) 1030 of FIG. 10). The LB subnet(s) 1122 contained in the control plane DMZ tier 1120 can be communicatively coupled to the app subnet(s) 1126 contained in the control plane app tier 1124 and an Internet gateway 1134 (e.g., the Internet gateway 1034 of FIG. 10) that can be contained in the control plane VCN 1116, and the app subnet(s) 1126 can be communicatively coupled to the DB subnet(s) 1130 contained in the control plane data tier 1128 and a service gateway 1136 (e.g., the service gateway 1036 of FIG. 10) and a network address translation (NAT) gateway 1138 (e.g., the NAT gateway 1038 of FIG. 10). The control plane VCN 1116 can include the service gateway 1136 and the NAT gateway 1138.

The control plane VCN 1116 can include a data plane mirror app tier 1140 (e.g., the data plane mirror app tier 1040 of FIG. 10) that can include app subnet(s) 1126. The app subnet(s) 1126 contained in the data plane mirror app tier 1140 can include a virtual network interface controller (VNIC) 1142 (e.g., the VNIC of 1042) that can execute a compute instance 1144 (e.g., similar to the compute instance 1044 of FIG. 10). The compute instance 1144 can facilitate communication between the app subnet(s) 1126 of the data plane mirror app tier 1140 and the app subnet(s) 1126 that can be contained in a data plane app tier 1146 (e.g., the data plane app tier 1046 of FIG. 10) via the VNIC 1142 contained in the data plane mirror app tier 1140 and the VNIC 1142 contained in the data plane app tier 1146.

The Internet gateway 1134 contained in the control plane VCN 1116 can be communicatively coupled to a metadata management service 1152 (e.g., the metadata management service 1052 of FIG. 10) that can be communicatively coupled to public Internet 1154 (e.g., public Internet 1054 of FIG. 10). Public Internet 1154 can be communicatively coupled to the NAT gateway 1138 contained in the control plane VCN 1116. The service gateway 1136 contained in the control plane VCN 1116 can be communicatively couple to cloud services 1156 (e.g., cloud services 1056 of FIG. 10).

In some examples, the data plane VCN 1118 can be contained in the customer tenancy 1121. In this case, the IaaS provider may provide the control plane VCN 1116 for each customer, and the IaaS provider may, for each customer, set up a unique compute instance 1144 that is contained in the service tenancy 1119. Each compute instance 1144 may allow communication between the control plane VCN 1116, contained in the service tenancy 1119, and the data plane VCN 1118 that is contained in the customer tenancy 1121. The compute instance 1144 may allow resources, that are provisioned in the control plane VCN 1116 that is contained in the service tenancy 1119, to be deployed or otherwise used in the data plane VCN 1118 that is contained in the customer tenancy 1121.

In other examples, the customer of the IaaS provider may have databases that live in the customer tenancy 1121. In this example, the control plane VCN 1116 can include the data plane mirror app tier 1140 that can include app subnet(s) 1126. The data plane mirror app tier 1140 can reside in the data plane VCN 1118, but the data plane mirror app tier 1140 may not live in the data plane VCN 1118. That is, the data plane mirror app tier 1140 may have access to the customer tenancy 1121, but the data plane mirror app tier 1140 may not exist in the data plane VCN 1118 or be owned or operated by the customer of the IaaS provider. The data plane mirror app tier 1140 may be configured to make calls to the data plane VCN 1118 but may not be configured to make calls to any entity contained in the control plane VCN 1116. The customer may desire to deploy or otherwise use resources in the data plane VCN 1118 that are provisioned in the control plane VCN 1116, and the data plane mirror app tier 1140 can facilitate the desired deployment, or other usage of resources, of the customer.

In some embodiments, the customer of the IaaS provider can apply filters to the data plane VCN 1118. In this embodiment, the customer can determine what the data plane VCN 1118 can access, and the customer may restrict access to public Internet 1154 from the data plane VCN 1118. The IaaS provider may not be able to apply filters or otherwise control access of the data plane VCN 1118 to any outside networks or databases. Applying filters and controls by the customer onto the data plane VCN 1118, contained in the customer tenancy 1121, can help isolate the data plane VCN 1118 from other customers and from public Internet 1154.

In some embodiments, cloud services 1156 can be called by the service gateway 1136 to access services that may not exist on public Internet 1154, on the control plane VCN 1116, or on the data plane VCN 1118. The connection between cloud services 1156 and the control plane VCN 1116 or the data plane VCN 1118 may not be live or continuous. Cloud services 1156 may exist on a different network owned or operated by the IaaS provider. Cloud services 1156 may be configured to receive calls from the service gateway 1136 and may be configured to not receive calls from public Internet 1154. Some cloud services 1156 may be isolated from other cloud services 1156, and the control plane VCN 1116 may be isolated from cloud services 1156 that may not be in the same region as the control plane VCN 1116. For example, the control plane VCN 1116 may be located in "Region 1," and cloud service "Deployment 10," may be located in Region 1 and in "Region 2." If a call to Deployment 10 is made by the service gateway 1136 contained in the control plane VCN 1116 located in Region 1, the call may be transmitted to Deployment 10 in Region 1. In this example, the control plane VCN 1116, or Deployment 10 in Region 1, may not be communicatively coupled to, or otherwise in communication with, Deployment 10 in Region 2.

Figure 12:
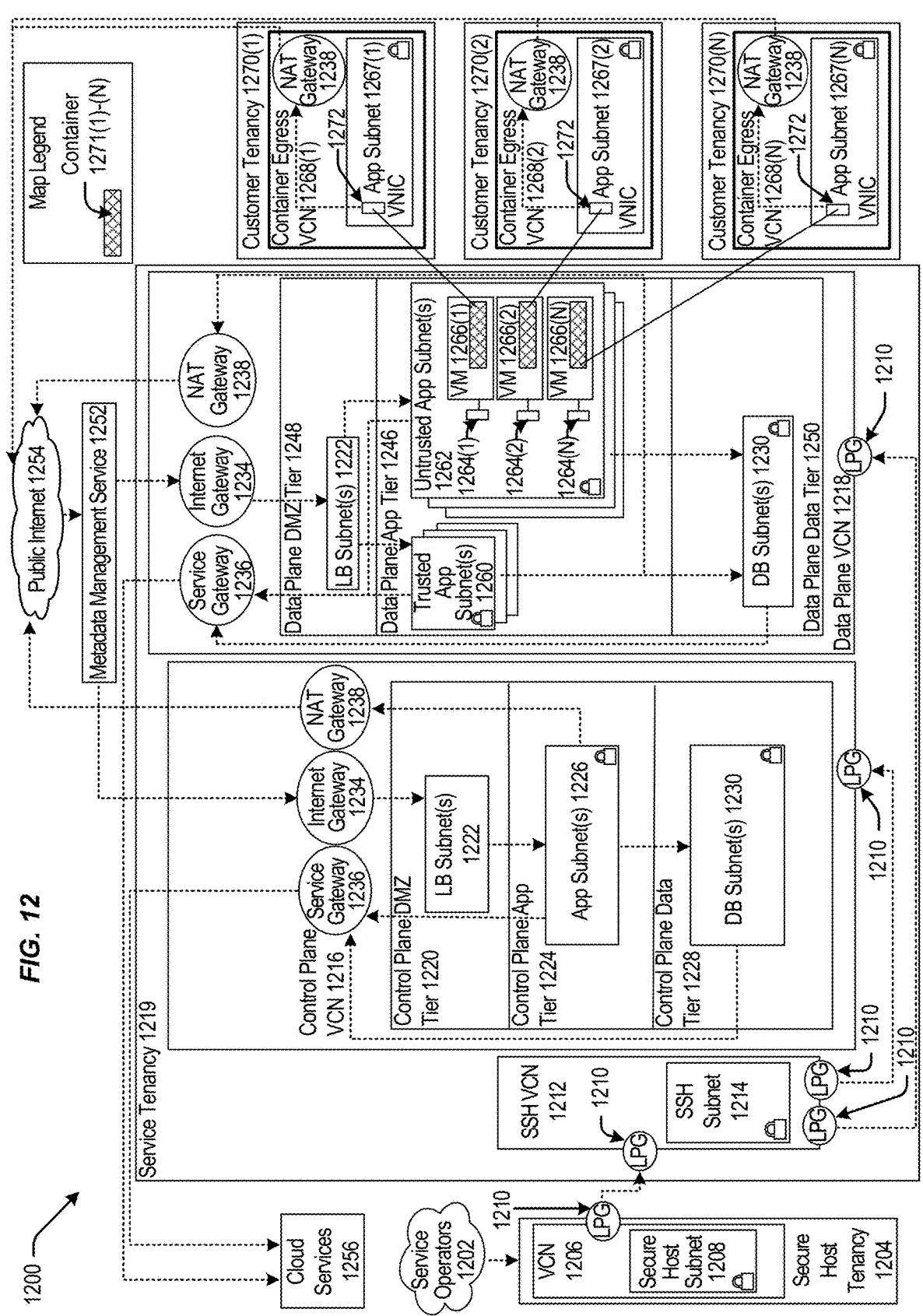
FIG. 12 is a block diagram illustrating another pattern for implementing a cloud infrastructure as a service system, according to at least one embodiment.

FIG. 12 is a block diagram 1200 illustrating another example pattern of an IaaS architecture, according to at least one embodiment. Service operators 1202 (e.g., service operators 1002 of FIG. 10) can be communicatively coupled to a secure host tenancy 1204 (e.g., the secure host tenancy 1004 of FIG. 10) that can include a virtual cloud network (VCN) 1206 (e.g., the VCN 1006 of FIG. 10) and a secure host subnet 1208 (e.g., the secure host subnet 1008 of FIG. 10). The VCN 1206 can include an LPG 1210 (e.g., the LPG

1010 of FIG. 10) that can be communicatively coupled to an SSH VCN 1212 (e.g., the SSH VCN 1012 of FIG. 10) via an LPG 1210 contained in the SSH VCN 1212. The SSH VCN 1212 can include an SSH subnet 1214 (e.g., the SSH subnet 1014 of FIG. 10), and the SSH VCN 1212 can be communicatively coupled to a control plane VCN 1216 (e.g., the control plane VCN 1016 of FIG. 10) via an LPG 1210 contained in the control plane VCN 1216 and to a data plane VCN 1218 (e.g., the data plane 1018 of FIG. 10) via an LPG 1210 contained in the data plane VCN 1218. The control plane VCN 1216 and the data plane VCN 1218 can be contained in a service tenancy 1219 (e.g., the service tenancy 1019 of FIG. 10).

The control plane VCN 1216 can include a control plane DMZ tier 1220 (e.g., the control plane DMZ tier 1020 of FIG. 10) that can include load balancer (LB) subnet(s) 1222 (e.g., LB subnet(s) 1022 of FIG. 10), a control plane app tier 1224 (e.g., the control plane app tier 1024 of FIG. 10) that can include app subnet(s) 1226 (e.g., similar to app subnet(s) 1026 of FIG. 10), a control plane data tier 1228 (e.g., the control plane data tier 1028 of FIG. 10) that can include DB subnet(s) 1230. The LB subnet(s) 1222 contained in the control plane DMZ tier 1220 can be communicatively coupled to the app subnet(s) 1226 contained in the control plane app tier 1224 and to an Internet gateway 1234 (e.g., the Internet gateway 1034 of FIG. 10) that can be contained in the control plane VCN 1216, and the app subnet(s) 1226 can be communicatively coupled to the DB subnet(s) 1230 contained in the control plane data tier 1228 and to a service gateway 1236 (e.g., the service gateway of FIG. 10) and a network address translation (NAT) gateway 1238 (e.g., the NAT gateway 1038 of FIG. 10). The control plane VCN 1216 can include the service gateway 1236 and the NAT gateway 1238.

The data plane VCN 1218 can include a data plane app tier 1246 (e.g., the data plane app tier 1046 of FIG. 10), a data plane DMZ tier 1248 (e.g., the data plane DMZ tier 1048 of FIG. 10), and a data plane data tier 1250 (e.g., the data plane data tier 1050 of FIG. 10). The data plane DMZ tier 1248 can include LB subnet(s) 1222 that can be communicatively coupled to trusted app subnet(s) 1260 and untrusted app subnet(s) 1262 of the data plane app tier 1246 and the Internet gateway 1234 contained in the data plane VCN 1218. The trusted app subnet(s) 1260 can be communicatively coupled to the service gateway 1236 contained in the data plane VCN 1218, the NAT gateway 1238 contained in the data plane VCN 1218, and DB subnet(s) 1230 contained in the data plane data tier 1250. The untrusted app subnet(s) 1262 can be communicatively coupled to the service gateway 1236 contained in the data plane VCN 1218 and DB subnet(s) 1230 contained in the data plane data tier 1250. The data plane data tier 1250 can include DB subnet(s) 1230 that can be communicatively coupled to the service gateway 1236 contained in the data plane VCN 1218.

The untrusted app subnet(s) 1262 can include one or more primary VNICs 1264(1)-(N) that can be communicatively coupled to tenant virtual machines (VMs) 1266(1)-(N). Each tenant VM 1266(1)-(N) can be communicatively coupled to a respective app subnet 1267(1)-(N) that can be contained in respective container egress VCNs 1268(1)-(N) that can be contained in respective customer tenancies 1270(1)-(N). Respective secondary VNICs 1272(1)-(N) can facilitate communication between the untrusted app subnet(s) 1262 contained in the data plane VCN 1218 and the app subnet contained in the container egress VCNs 1268(1)-(N). Each container egress VCNs 1268(1)-(N) can include a NAT gateway 1238 that can be communicatively coupled to public Internet 1254 (e.g., public Internet 1054 of FIG. 10).

The Internet gateway 1234 contained in the control plane VCN 1216 and contained in the data plane VCN 1218 can be communicatively coupled to a metadata management service 1252 (e.g., the metadata management system 1052 of FIG. 10) that can be communicatively coupled to public Internet 1254. Public Internet 1254 can be communicatively coupled to the NAT gateway 1238 contained in the control plane VCN 1216 and contained in the data plane VCN 1218. The service gateway 1236 contained in the control plane VCN 1216 and contained in the data plane VCN 1218 can be communicatively couple to cloud services 1256.

In some embodiments, the data plane VCN 1218 can be integrated with customer tenancies 1270. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 1246. Code to run the function may be executed in the VMs 1266(1)-(N), and the code may not be configured to run anywhere else on the data plane VCN 1218. Each VM 1266(1)-(N) may be connected to one customer tenancy 1270. Respective containers 1271(1)-(N) contained in the VMs 1266(1)-(N) may be configured to run the code. In this case, there can be a dual isolation (e.g., the containers 1271(1)-(N) running code, where the containers 1271(1)-(N) may be contained in at least the VM 1266(1)-(N) that are contained in the untrusted app subnet(s) 1262), which may help prevent incorrect or otherwise undesirable code from damaging the network of the IaaS provider or from damaging a network of a different customer. The containers 1271(1)-(N) may be communicatively coupled to the customer tenancy 1270 and may be configured to transmit or receive data from the customer tenancy 1270. The containers 1271(1)-(N) may not be configured to transmit or receive data from any other entity in the data plane VCN 1218. Upon completion of running the code, the IaaS provider may kill or otherwise dispose of the containers 1271(1)-(N).

In some embodiments, the trusted app subnet(s) 1260 may run code that may be owned or operated by the IaaS provider. In this embodiment, the trusted app subnet(s) 1260 may be communicatively coupled to the DB subnet(s) 1230 and be configured to execute CRUD operations in the DB subnet(s) 1230. The untrusted app subnet(s) 1262 may be communicatively coupled to the DB subnet(s) 1230, but in this embodiment, the untrusted app subnet(s) may be configured to execute read operations in the DB subnet(s) 1230. The containers 1271(1)-(N) that can be contained in the VM 1266(1)-(N) of each customer and that may run code from the customer may not be communicatively coupled with the DB subnet(s) 1230.

In other embodiments, the control plane VCN 1216 and the data plane VCN 1218 may not be directly communicatively coupled. In this embodiment, there may be no direct communication between the control plane VCN 1216 and the data plane VCN 1218. However, communication can occur indirectly through at least one method. An LPG 1210 may be established by the IaaS provider that can facilitate communication between the control plane VCN 1216 and the data plane VCN 1218. In another example, the control plane VCN 1216 or the data plane VCN 1218 can make a call to cloud services 1256 via the service gateway 1236. For example, a call to cloud services 1256 from the control plane VCN 1216 can include a request for a service that can communicate with the data plane VCN 1218.

Figure 13:
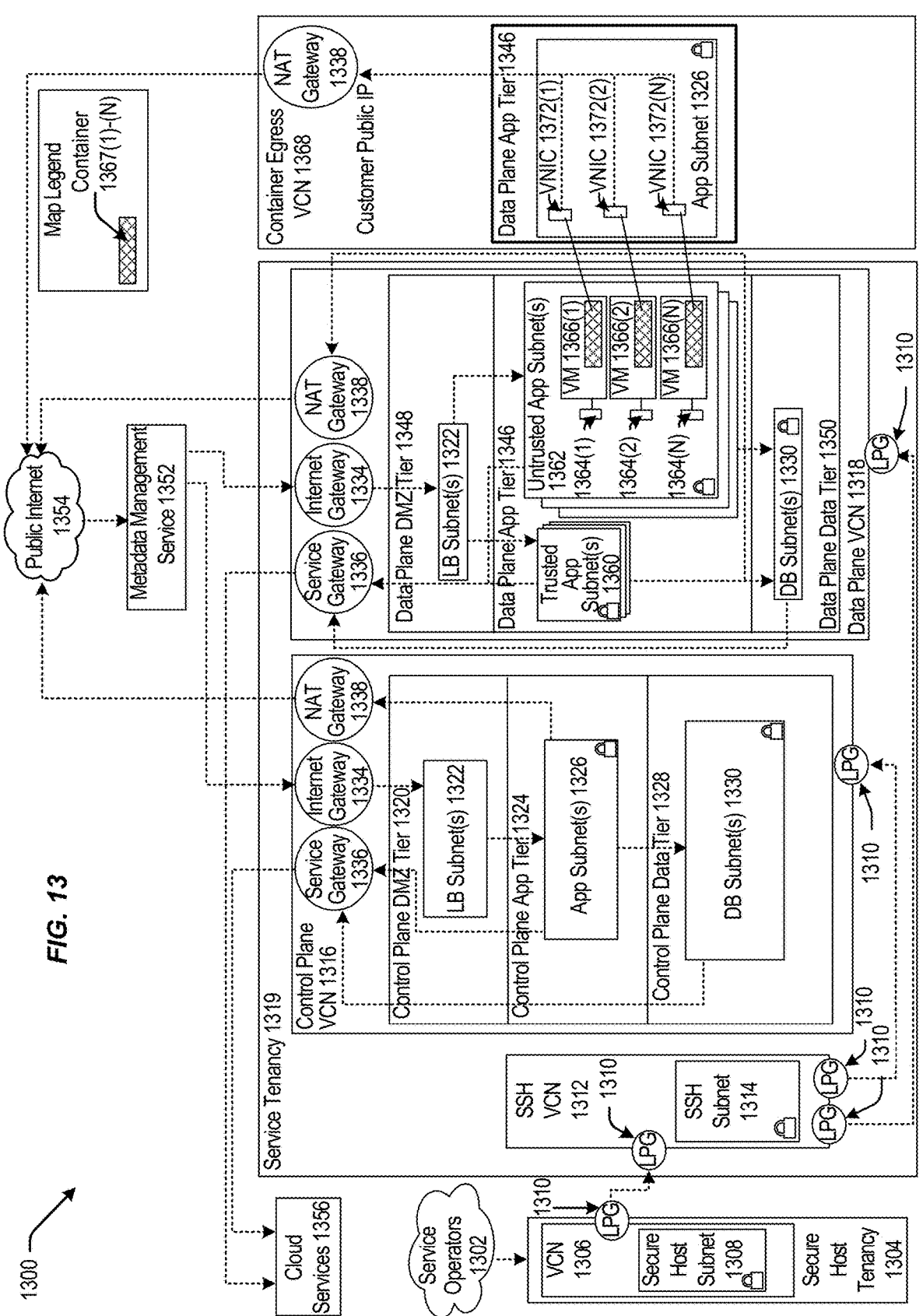
FIG. 13 is a block diagram illustrating another pattern for implementing a cloud infrastructure as a service system, according to at least one embodiment.

FIG. 13 is a block diagram 1300 illustrating another example pattern of an IaaS architecture, according to at least one embodiment. Service operators 1302 (e.g., service operators 1002 of FIG. 10) can be communicatively coupled to a secure host tenancy 1304 (e.g., the secure host tenancy 1004 of FIG. 10) that can include a virtual cloud network (VCN) 1306 (e.g., the VCN 1006 of FIG. 10) and a secure host subnet 1308 (e.g., the secure host subnet 1008 of FIG. 10). The VCN 1306 can include an LPG 1310 (e.g., the LPG 1010 of FIG. 10) that can be communicatively coupled to an SSH VCN 1312 (e.g., the SSH VCN 1012 of FIG. 10) via an LPG 1310 contained in the SSH VCN 1312. The SSH VCN 1312 can include an SSH subnet 1314 (e.g., the SSH subnet 1014 of FIG. 10), and the SSH VCN 1312 can be communicatively coupled to a control plane VCN 1316 (e.g., the control plane VCN 1016 of FIG. 10) via an LPG 1310 contained in the control plane VCN 1316 and to a data plane VCN 1318 (e.g., the data plane 1018 of FIG. 10) via an LPG 1310 contained in the data plane VCN 1318. The control plane VCN 1316 and the data plane VCN 1318 can be contained in a service tenancy 1319 (e.g., the service tenancy 1019 of FIG. 10).

The control plane VCN 1316 can include a control plane DMZ tier 1320 (e.g., the control plane DMZ tier 1020 of FIG. 10) that can include LB subnet(s) 1322 (e.g., LB subnet(s) 1022 of FIG. 10), a control plane app tier 1324 (e.g., the control plane app tier 1024 of FIG. 10) that can include app subnet(s) 1326 (e.g., app subnet(s) 1026 of FIG. 10), a control plane data tier 1328 (e.g., the control plane data tier 1028 of FIG. 10) that can include DB subnet(s) 1330 (e.g., DB subnet(s) 1230 of FIG. 12). The LB subnet(s) 1322 contained in the control plane DMZ tier 1320 can be communicatively coupled to the app subnet(s) 1326 contained in the control plane app tier 1324 and to an Internet gateway 1334 (e.g., the Internet gateway 1034 of FIG. 10) that can be contained in the control plane VCN 1316, and the app subnet(s) 1326 can be communicatively coupled to the DB subnet(s) 1330 contained in the control plane data tier 1328 and to a service gateway 1336 (e.g., the service gateway of FIG. 10) and a network address translation (NAT) gateway 1338 (e.g., the NAT gateway 1038 of FIG. 10). The control plane VCN 1316 can include the service gateway 1336 and the NAT gateway 1338.

The data plane VCN 1318 can include a data plane app tier 1346 (e.g., the data plane app tier 1046 of FIG. 10), a data plane DMZ tier 1348 (e.g., the data plane DMZ tier 1048 of FIG. 10), and a data plane data tier 1350 (e.g., the data plane data tier 1050 of FIG. 10). The data plane DMZ tier 1348 can include LB subnet(s) 1322 that can be communicatively coupled to trusted app subnet(s) 1360 (e.g., trusted app subnet(s) 1260 of FIG. 12) and untrusted app subnet(s) 1362 (e.g., untrusted app subnet(s) 1262 of FIG. 12) of the data plane app tier 1346 and the Internet gateway 1334 contained in the data plane VCN 1318. The trusted app subnet(s) 1360 can be communicatively coupled to the service gateway 1336 contained in the data plane VCN 1318, the NAT gateway 1338 contained in the data plane VCN 1318, and DB subnet(s) 1330 contained in the data plane data tier 1350. The untrusted app subnet(s) 1362 can be communicatively coupled to the service gateway 1336 contained in the data plane VCN 1318 and DB subnet(s) 1330 contained in the data plane data tier 1350. The data plane data tier 1350 can include DB subnet(s) 1330 that can be communicatively coupled to the service gateway 1336 contained in the data plane VCN 1318.

The untrusted app subnet(s) 1362 can include primary VNICs 1364(1)-(N) that can be communicatively coupled to tenant virtual machines (VMs) 1366(1)-(N) residing within the untrusted app subnet(s) 1362. Each tenant VM 1366(1)-(N) can run code in a respective container 1367(1)-(N), and be communicatively coupled to an app subnet 1326 that can be contained in a data plane app tier 1346 that can be contained in a container egress VCN 1368. Respective secondary VNICs 1372(1)-(N) can facilitate communication between the untrusted app subnet(s) 1362 contained in the data plane VCN 1318 and the app subnet contained in container egress VCN 1368. The container egress VCN can include a NAT gateway 1338 that can be communicatively coupled to public Internet 1354 (e.g., public Internet 1054 of FIG. 10).

The Internet gateway 1334 contained in the control plane VCN 1316 and contained in the data plane VCN 1318 can be communicatively coupled to a metadata management service 1352 (e.g., the metadata management system 1052 of FIG. 10) that can be communicatively coupled to public Internet 1354. Public Internet 1354 can be communicatively coupled to the NAT gateway 1338 contained in the control plane VCN 1316 and contained in the data plane VCN 1318. The service gateway 1336 contained in the control plane VCN 1316 and contained in the data plane VCN 1318 can be communicatively couple to cloud services 1356.

In some examples, the pattern illustrated by the architecture of block diagram 1300 of FIG. 13 may be considered an exception to the pattern illustrated by the architecture of block diagram 1200 of FIG. 12 and may be desirable for a customer of the IaaS provider if the IaaS provider cannot directly communicate with the customer (e.g., a disconnected region). The respective containers 1367(1)-(N) that are contained in the VMs 1366(1)-(N) for each customer can be accessed in real-time by the customer. The containers 1367(1)-(N) may be configured to make calls to respective secondary VNICs 1372(1)-(N) contained in app subnet(s) 1326 of the data plane app tier 1346 that can be contained in the container egress VCN 1368. The secondary VNICs 1372(1)-(N) can transmit the calls to the NAT gateway 1338 that may transmit the calls to public Internet 1354. In this example, the containers 1367(1)-(N) that can be accessed in real-time by the customer can be isolated from the control plane VCN 1316 and can be isolated from other entities contained in the data plane VCN 1318. The containers 1367(1)-(N) may also be isolated from resources from other customers.

In other examples, the customer can use the containers 1367(1)-(N) to call cloud services 1356. In this example, the customer may run code in the containers 1367(1)-(N) that requests a service from cloud services 1356. The containers 1367(1)-(N) can transmit this request to the secondary VNICs 1372(1)-(N) that can transmit the request to the NAT gateway that can transmit the request to public Internet 1354. Public Internet 1354 can transmit the request to LB subnet(s) 1322 contained in the control plane VCN 1316 via the Internet gateway 1334. In response to determining the request is valid, the LB subnet(s) can transmit the request to app subnet(s) 1326 that can transmit the request to cloud services 1356 via the service gateway 1336.

It should be appreciated that IaaS architectures 1000, 1100, 1200, 1300 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 14:
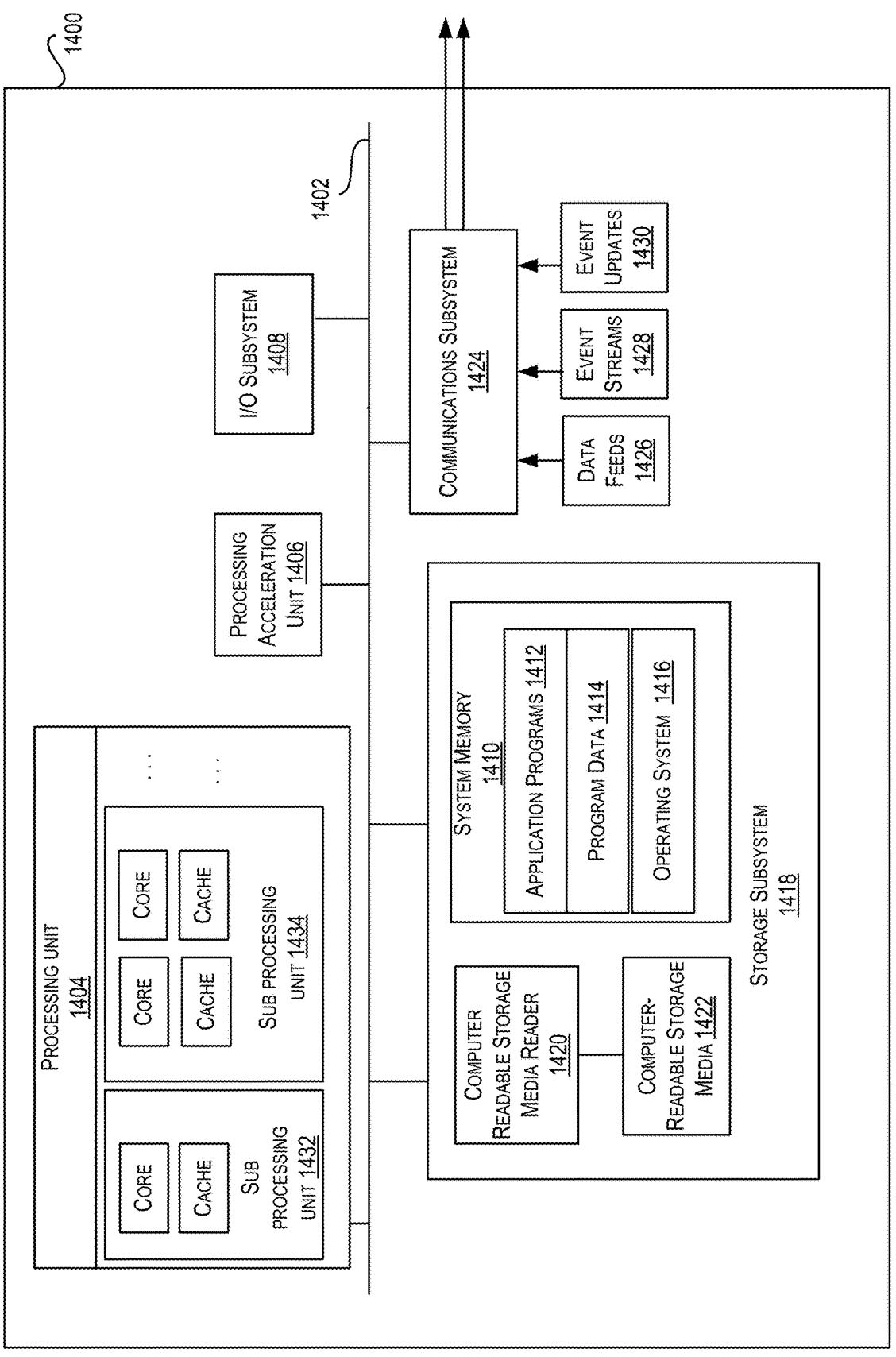
FIG. 14 illustrates an example computer system 1400, in which various embodiments may be implemented.

FIG. 14 illustrates an example computer system 1400, in which various embodiments may be implemented. The system 1400 may be used to implement any of the computer systems described above. As shown in the figure, computer system 1400 includes a processing unit 1404 that communicates with a number of peripheral subsystems via a bus subsystem 1402. These peripheral subsystems may include a processing acceleration unit 1406, an I/O subsystem 1408, a storage subsystem 1418 and a communications subsystem 1424. Storage subsystem 1418 includes tangible computer-readable storage media 1422 and a system memory 1410.

Bus subsystem 1402 provides a mechanism for letting the various components and subsystems of computer system 1400 communicate with each other as intended. Although bus subsystem 1402 is shown schematically as a single bus, alternative embodiments of the bus subsystem may utilize multiple buses. Bus subsystem 1402 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1404, which can be implemented as one or more integrated circuits (e.g., a conventional microprocessor or microcontroller), controls the operation of computer system 1400. One or more processors may be included in processing unit 1404. These processors may include single core or multicore processors. In certain embodiments, processing unit 1404 may be implemented as one or more independent processing units 1432 and/or 1434 with single or multicore processors included in each processing unit. In other embodiments, processing unit 1404 may also be implemented as a quad-core processing unit formed by integrating two dual-core processors into a single chip.

In various embodiments, processing unit 1404 can execute a variety of programs in response to program code and can maintain multiple concurrently executing programs or processes. At any given time, some or all of the program code to be executed can be resident in processor(s) 1404 and/or in storage subsystem 1418. Through suitable programming, processor(s) 1404 can provide various functionalities described above. Computer system 1400 may additionally include a processing acceleration unit 1406, which can include a digital signal processor (DSP), a special-purpose processor, and/or the like.

I/O subsystem 1408 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1400 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1400 may comprise a storage subsystem 1418 that provides a tangible non-transitory computer-readable storage medium for storing software and data constructs that provide the functionality of the embodiments described in this disclosure. The software can include programs, code modules, instructions, scripts, etc., that when executed by one or more cores or processors of processing unit 1404 provide the functionality described above. Storage subsystem 1418 may also provide a repository for storing data used in accordance with the present disclosure.

As depicted in the example in FIG. 14, storage subsystem 1418 can include various components including a system memory 1410, computer-readable storage media 1422, and a computer readable storage media reader 1420. System memory 1410 may store program instructions that are loadable and executable by processing unit 1404. System memory 1410 may also store data that is used during the execution of the instructions and/or data that is generated during the execution of the program instructions. Various different kinds of programs may be loaded into system memory 1410 including but not limited to client applications, Web browsers, mid-tier applications, relational database management systems (RDBMS), virtual machines, containers, etc.

System memory 1410 may also store an operating system 1416. Examples of operating system 1416 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 1400 executes one or more virtual machines, the virtual machines along with their guest operating systems (GOSs) may be loaded into system memory 1410 and executed by one or more processors or cores of processing unit 1404.

System memory 1410 can come in different configurations depending upon the type of computer system 1400. For example, system memory 1410 may be volatile memory (such as random access memory (RAM)) and/or non-volatile memory (such as read-only memory (ROM), flash memory, etc.) Different types of RAM configurations may be provided including a static random access memory (SRAM), a dynamic random access memory (DRAM), and others. In some implementations, system memory 1410 may include a basic input/output system (BIOS) containing basic routines that help to transfer information between elements within computer system 1400, such as during start-up.

Computer-readable storage media 1422 may represent remote, local, fixed, and/or removable storage devices plus storage media for temporarily and/or more permanently containing, storing, computer-readable information for use by computer system 1400 including instructions executable by processing unit 1404 of computer system 1400.

Computer-readable storage media 1422 can include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 1422 may include a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM, DVD, and Blu-Ray® disk, or other optical media. Computer-readable storage media 1422 may include, but is not limited to, Zip® drives, flash memory cards, universal serial bus (USB) flash drives, secure digital (SD) cards, DVD disks, digital video tape, and the like. Computer-readable storage media 1422 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1400.

Machine-readable instructions executable by one or more processors or cores of processing unit 1404 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 1424 provides an interface to other computer systems and networks. Communications subsystem 1424 serves as an interface for receiving data from and transmitting data to other systems from computer system 1400. For example, communications subsystem 1424 may enable computer system 1400 to connect to one or more devices via the Internet. In some embodiments communications subsystem 1424 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1424 can provide wired network connectivity (e.g., Ethernet) in addition to or instead of a wireless interface.

In some embodiments, communications subsystem 1424 may also receive input communication in the form of structured and/or unstructured data feeds 1426, event streams 1428, event updates 1430, and the like on behalf of one or more users who may use computer system 1400.

By way of example, communications subsystem 1424 may be configured to receive data feeds 1426 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1424 may also be configured to receive data in the form of continuous data streams, which may include event streams 1428 of real-time events and/or event updates 1430, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1424 may also be configured to output the structured and/or unstructured data feeds 1426, event streams 1428, event updates 1430, and the like to one or more databases that may be in communication with one or more streaming data source computers coupled to computer system 1400.

Computer system 1400 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1400 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or services are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method, comprising:
   receiving, by a computing system, a primary document comprising one or more selection boxes, one or more text lines, and one or more annotations;
   determining, by the computing system, a class based at least in part on the annotations;
   identifying, by the computing system, the one or more selection boxes and one or more text lines of the primary document;
   generating, by the computing system, a graph representing the one or more selection boxes and the one or more text lines;
   mapping, by the computing system, each of the one or more selection boxes to a respective text line of the one or more text lines of the graph based at least in part on one or more characteristics associated with the selection boxes;
   generating, by the computing system, a key-value pair associated with each of the one or more text lines based at least in part on the mapping; and
   generating, by the computing system, a document model of the primary document including the key-value pair.

2. The method of claim 1, wherein the one or more characteristics comprise a vector between each of the one or more selection boxes and each of the one or more text lines, and the graph comprises a bi-partite graph wherein a first set of the graph comprises the selection boxes, and a second set of the graph comprises the one or more text lines.

3. The method of claim 1, further comprising:
   accessing, by the computing system, the document model of the primary document;
   receiving, by the computing system, a user-filled document based at least in part on the primary document;
   determining, by the computing system, that a selection box of the one or more selection boxes has been marked; and
   in response to determining that the selection box has been marked:
      extracting, by the computing system and from the user-filled document, information associated with the key-value pair associated with the marked selection box.

4. The method of claim 1, wherein the selection boxes and the one or more text lines are determined using Optical Character Recognition.

5. The method of claim 1, wherein the annotations are associated with each selection box of the primary document.

6. The method of claim 1, wherein the graph comprises a representation of each selection box of the primary document.

7. The method of claim 1, wherein the annotations are associated with a section of the primary document, the section including at least a subset of the selection boxes of the primary document and a subset of the one or more text lines of the primary document.

8. The method of claim 7, wherein the graph comprises the subset of the selection boxes of the primary document and the subset of the one or more text lines of the primary document.

9. The method of claim 1, wherein the class for a particular selection box is determined at least in part by a text line associated with the particular selection box.

10. The method of claim 1, wherein a text line associated with a text line of the one or more text lines comprises typed and/or handwritten text.

11. The method of claim 1, wherein the key of the key-value pair is the class and the value is based at least in part on the one or more text lines and/or the one or more selection boxes.

12. The method of claim 1, wherein the class is the respective text line, the key of the key-value pair corresponds to the class, and the value is based at least in part on a state of a corresponding selection box.

13. The method of claim 1, wherein the mapping is performed using a Hungarian Matching Algorithm.

14. A computing system, comprising:
   one or more processors; and
   a non-transitory computer-readable medium containing instructions that, when executed by the one or more processors, cause the system to perform operations to:

receive, by the computing system, a primary document comprising one or more selection boxes, one or more text lines, and one or more annotations;

determine, by the computing system, a class based at least in part on the annotations;

determine, by the computing system, the one or more selection boxes and one or more text lines associated with the class;

generate, by the computing system, a graph representing the one or more selection boxes and the one or more text lines;

map, by the computing system, each of the one or more selection boxes to a respective text line of the one or more text lines of the graph, based at least in part on one or more characteristics associated with the selection boxes;

generate, by the computing system, a key-value pair for each of the one or more text lines based at least in part on the mapping, wherein the key is the class and the value is an associated text line; and generate, by the computing system, a document model of the primary document including the key-value pairs.

15. The computing system of claim 14, wherein the operations further cause the computing system to:

access, by the computing system, the document model of the primary document;

receive, by the computing system, a document corresponding to the primary document;

determine, by the computing system, that a selection box of the one or more selection boxes has been marked; and in response to determining that the selection box has been marked:

extract, by the computing system, information associated with the key-value pair associated with the marked selection box.

16. The computing system of claim 14, wherein the selection boxes and the one or more text lines are determined using Optical Character Recognition.

17. The computing system of claim 14, wherein the mapping is performed using a Hungarian Matching Algorithm.

18. The computing system of claim 14, wherein the annotations are associated with each selection box of the primary document.

19. A non-transitory computer readable medium comprising instructions that, when executed by one or more processors, cause the one or more processors to perform steps comprising:

receiving, by a computing system, a primary document comprising one or more selection boxes, one or more text lines, and one or more annotations;

determining, by the computing system, a class based at least in part on the annotations;

determining, by the computing system, the one or more selection boxes and one or more text lines associated with the class;

generating, by the computing system, a graph representing the one or more selection boxes and the one or more text lines;

mapping, by the computing system, each of the one or more selection boxes to a respective text line of the one or more text lines of the graph, based at least in part on one or more characteristics associated with the selection boxes;

generating, by the computing system, a key-value pair for each of the one or more text lines based at least in part on the mapping, wherein the key is the class and the value is an associated text line; and generating, by the computing system, a document model of the primary document including the key-value pairs.

20. The non-transitory computer-readable medium of claim 19, wherein the selection boxes and the one or more text lines are determined using Optical Character Recognition.

* * * * *